(12) United States Patent
Smith-Aulie

(10) Patent No.: US 12,164,830 B1
(45) Date of Patent: Dec. 10, 2024

(54) MEDIA CONTENT NAVIGATION USER INTERFACE

(71) Applicant: Block, Inc., Oakland, CA (US)

(72) Inventor: Simen Smith-Aulie, Oslo (NO)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/324,747

(22) Filed: May 26, 2023

(51) Int. Cl.
| | |
|---|---|
| *G06F 3/048* | (2013.01) |
| *G06F 3/0482* | (2013.01) |
| *G06F 3/0488* | (2022.01) |
| *G06F 3/16* | (2006.01) |
| *G06F 3/041* | (2006.01) |

(52) U.S. Cl.
CPC ............ *G06F 3/165* (2013.01); *G06F 3/0482* (2013.01); *G06F 3/0488* (2013.01); *G06F 3/0414* (2013.01)

(58) Field of Classification Search
CPC ....... G06F 3/165; G06F 3/0482; G06F 3/0488
See application file for complete search history.

(56) References Cited

U.S. PATENT DOCUMENTS

| | | | | |
|---|---|---|---|---|
| 9,223,458 B1 * | 12/2015 | Qureshi | ............... | G11B 27/038 |
| 10,203,794 B1 * | 2/2019 | Smith | ................. | G06F 3/04845 |
| 2008/0279526 A1 * | 11/2008 | Tanaka | ................... | H04N 5/772 |
| | | | | 386/353 |
| 2009/0006993 A1 * | 1/2009 | Tuli | .................... | H04N 21/4668 |
| | | | | 715/764 |
| 2017/0357421 A1 * | 12/2017 | Dye | .................... | H04N 21/8113 |
| 2018/0188945 A1 * | 7/2018 | Garmark | ................. | G06F 3/167 |
| 2020/0192551 A1 * | 6/2020 | Herzog | ............... | G06F 3/04817 |
| 2022/0413665 A1 | 12/2022 | Lewis et al. | | |

OTHER PUBLICATIONS

International Search Report and Written Opinion mailed on Aug. 6, 2024, received for PCT Application PCT/US2024/031134, filed on May 24, 2024, 11 pages.

* cited by examiner

*Primary Examiner* — Claudia Dragoescu
(74) *Attorney, Agent, or Firm* — IP Spring

(57) ABSTRACT

Technologies are described herein for media content navigation in user interfaces. For example, a method of media content navigation may include receiving a request to initialize a media application, generating a first playlist comprising a first plurality of media content items and a second playlist comprising a second plurality of media content items, providing a media content item of the first plurality of media content items for playback and a user interface comprising a representation of the media content item to the user device, receiving an indication of a gesture input from the user device to transition from the media content item, and causing the user device to display another representation of another media content item of the second plurality of media content items in the user interface and to playback the another media content item in response to the indication of the gesture input.

20 Claims, 21 Drawing Sheets

MEDIA CONTENT NAVIGATION USER INTERFACE

TECHNICAL FIELD

Music listeners wishing to stream songs for listening typically initialize a music streaming application and select songs to playback. A music streaming application often utilizes user interfaces to allow users to navigate through the application, select songs for playback, and control songs during playback. The description provided herein is for the purpose of presenting the context of the disclosure. Content of this section, as well as aspects of the description that may not otherwise qualify as prior art at the time of filing, are neither expressly nor impliedly admitted as prior art against the present disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
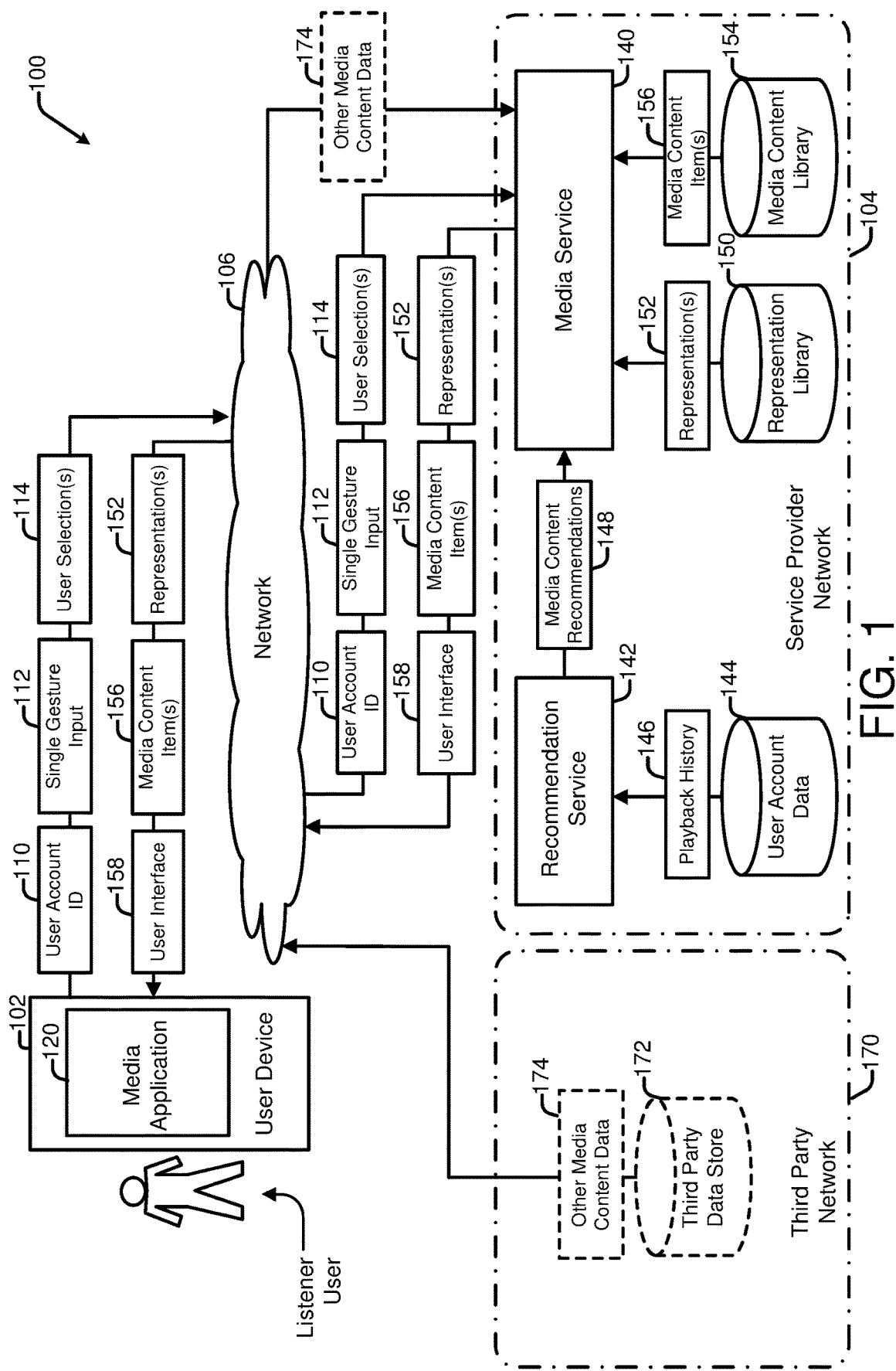
FIG. 1 is a diagram showing aspects of an illustrative operating environment and several logical components provided by the technologies described herein.

The following detailed description is directed to technologies for media content navigation user interfaces. Listener users may be users who use media applications for playback of media content items, such as songs, videos, music, sound effects, or other media content items. The media applications may provide media content items to a user device, for playback at the user device, such as by streaming or transmitting a computer-executable file to the user device.

Conventional media applications typically provide a "landing page" upon initialization that provide users with selectable options for media content playback. For example, the options may include options to select a playlist, track, artist, or other options to begin media playback. These user interfaces may be cumbersome and difficult to navigate.

For example, some user interfaces for media applications require a user to type in data, select preferences, select a media content item or multiple items, generate a playlist through manual selection, and/or input other data prior to beginning playback of content. In these example user interfaces, users may iterate through five or more different steps prior to playback commencing. Furthermore, the landing-page-centric nature of conventional media applications involve multiple user interface navigations to change what media content is being played back. For instance, a user of a conventional media application navigates from a player user interface of a currently-paying media item, to a playlist for the currently-playing media item, to the landing page, then to a playlist of a different item shown on the landing page, then to a different media item within the playlist to initiate playback of the different media item.

As an additional example, some user interfaces for media applications denote different "tiers" of service where a user may have to select payment or non-paying user options. In some examples, users selecting a non-paying option may further have "skip limitations" or other feature-locks that can require even more steps prior to commencement of playback. For example, a user may be locked out of different options and instead be locked-in a particular form of media content selection, such as by artist, album, or genre, but lack other granular selections. In these scenarios, users may find it difficult to locate desirable media content items to playback and may experience significant delays in playback of desirable media content items due to skip limitations locking the user into listening to several different content items prior to desirable content being made available for playback.

However, as described herein, media content navigation user interfaces significantly reduce the number of steps to arrive at content selection. Additionally, media content navigation user interfaces as described herein may overcome drawbacks associated with initial playback by automatically initiating playback, such as based upon user account data.

For example, in an implementation, a media content navigation user interface may allow a user to request initialization of the media application and immediately begin playback of a media content item automatically selected for the user account based upon prior playback history, user preferences, context, and other attributes. The attributes may be adjustable by a user through use of the media content navigation user interface to further streamline initialization of playback in future iterations. The immediate playback based on the request to initialize the application may reduce drawbacks associated with conventional user interfaces and may provide technical effects and benefits including reduced computational loads associated with serving multiple user interfaces to a user for content selection.

The described user interfaces may include a simplified navigation paradigm whereby a user may input a gesture input (or in many cases, a reduced number of inputs when compared to conventional systems) indicative of a desired media content item for playback. For example, the gesture input may indicate a selection of a different playlist, selection of a different song from a current playlist, and/or may indicate a request to deviate from a currently played type of media content item. The gesture input may provide technical effects and benefits including reduced computational loads associated with the transmission of complex identifying data associated with the selection of particular media content items. Furthermore, the gesture input may reduce computational loads associated with multiple levels of user interfaces and navigation control data required by other user interfaces.

The gesture input indicative of a new playlist may include a swipe in a particular direction against a screen of a user device. Responsive to the swipe, the techniques described herein may automatically select a new media content item from a different playlist based upon the direction of the swipe and, in some cases, an intensity, a force, or a duration associated with the swipe.

The gesture input indicative of a different song may include a swipe in a different direction than the direction associated with changing playlists, where the swipe in this case traverses a current playlist. Responsive to the swipe, the techniques described herein May automatically select a different media content item from the current playlist based upon the direction of the swipe (e.g., backwards or forwards) and, in some cases, the intensity or force associated with the swipe.

Additionally gesture inputs denoting other navigational requests may be customizable by the user such that the user may input many different gestures to automatically control the playback of media content items without further input or distractions. Accordingly, the gesture inputs, including single gesture inputs, described herein may provide technical effects and benefits including reducing computational load at the user device (i.e., reducing multiple levels of controls and navigation necessary to find media content), reducing an amount of data transmitted to a server for navigating the playlists/music library (i.e., a swipe direction and intensity may be transmitted in lieu of additional content selection data), and improving user experiences (i.e., reduces aesthetic/graphical complexity, improves useability, and reduces hurdles in first use by a novice user).

Furthermore, as the techniques described herein rely on gesture inputs, such as single gesture inputs, to provide inputs for automatic selection of songs, rather than transmitting playlist data or other lengthy data from a user device to a server, further technical advantages may be realized in bandwidth usage and network activity bottlenecks. For example, many existing solutions rely on caching large amounts of media content item data on a user device which may use significant network and storage resources. According to the techniques described herein, however, network bandwidth is reduced to transmitting currently playing media and directionally adjacent media content items, rather than the hundreds of songs typically required. So rather than conventional systems that cache dozens/hundreds of songs based on what the user account has most recently played, the techniques described herein may direct a user device to selectively cache fewer media content items based on a swipe direction adjacency to currently played media content (e.g., caching of content to be played if a user were to swipe across, swipe down, etc.). Therefore, the techniques described herein may save memory on the user device by caching fewer media content items.

In the following detailed description, references are made to the accompanying drawings that form a part hereof, and which are shown by way of illustration as specific implementations or examples. Referring now to the drawings, aspects of computing systems and methodologies for automatic generation of timing-based media content will be described in detail.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 illustrates an operating environment and several logical components provided by the technologies described herein. In particular, FIG. 1 is a diagram showing a system 100, according to one implementation.

System 100 is provided for illustration. In some implementations, the system 100 may include the same, fewer, more, or different elements configured in the same or different manner as that shown in FIG. 1.

The system 100 may include a user device 102, a service provider network 104, and an (optional) third-party network 170, which are connected via a network 106. Differing numbers of users and user devices may be operatively connected to the network 106 and/or in operation with the system 100.

The user device 102 may include any suitable computing device, for example a personal computer (PC), mobile device (e.g., laptop, mobile phone, smart phone, table computer, netbook computer, etc.), network-connected television, audio/video componentry with Internet access, network-connected cable set-top box, network-connected audio/video device (e.g., HDMI-interfaced smart component configured to display video and provide audio to a television or monitor), automobile head-unit with network-access (e.g., car stereo or car console device), or other suitable device.

The user device 102 may be associated with a listener user. The listener user may listen to media content items, watch and listen to videos, and otherwise stream media content items onto the user device 102. The listener user may also curate playlists for storage on the user device 102 and/or streaming, select user preferences for automatic features described herein, input gesture inputs (e.g., comprised of single gestures or multiple gestures) with the user device 102, and the like.

The user device 102 may include one or more instances of a media application 120 configured to execute thereon. In some implementations, the media application 120 includes computer-executable code configured to implement the technologies as described herein. The media application 120 may be configured to provide one or more user interfaces, receive user interaction data and/or user selections, and/or provide media content items for enjoyment by a listener user.

For example, in some implementations, the media application 120 is configured to present a user interface 158. The user interface 158 may be configured to automatically present a representation 152 of media content item 156 and initiate playback of media content item 156 based upon user account data or other data. In some implementations, a user account identifier (ID) 110 may be transmitted to the service provider network 104 over the network 106. In some implementations, the user account ID 110 may be received by the service provider network 104 directly from the user device 102.

Responsive to receipt of the user account ID 110, user interface 158, media content item(s) 156, and representation(s) 152 may be transmitted to the user device 102 over the network 106. In some implementations, the user interface 158, media content item(s) 156, and representation(s) 152 may be received by the user device 102 directly from the service provider network 104.

In some implementations, network 106 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

The service provider network 104 may be a platform including one or more servers having one or more computing devices (e.g., a cloud computing system, cluster of physical servers, etc.). The service provider network 104 may be configured as a software-as-a-service (SaaS) platform, a media content platform, a social networking platform, and/or as another computing platform configured to provide engaging experiences for listener users and content creators. In some implementations, the service provider network 104 monetizes media content or other content and provides monetary revenue to creators of the monetized content.

The service provider network 104 may include instances of a media service 140 and a recommendation service 142.

In some implementations, the recommendation service 142 may comprise one or more machine learning models configured to receive as input playback history 146 that is retrieved from a user account data store 144. The playback history 146 may be associated with user account ID 110. The recommendation service 142 may use the playback history 146 to determine media content recommendations 148. In some cases, such as where playback history 146 is unavailable for a particular user account ID, the recommendation service 142 may use information provided by the listener user (such as preferred genres, preferred artists, preferred media content items, demographic information, and the like) as inputs to determine media content recommendations 148.

The machine learning model associated with the recommendation service 142 may also receive as input other media content data 174 retrieved from a third-party datastore 172 available through third-party network 170, in some implementations. In some implementations, the third-party datastore 172 may be stored in a non-transitory computer readable memory (e.g., random access memory), a cache, a drive (e.g., a hard drive), a flash drive, a database system, or another type of component or device capable of storing data. The third-party datastore 172 may also include multiple storage components (e.g., multiple drives or multiple databases) that may also span multiple computing devices (e.g., across multiple server computers, in a distributed storage system, etc.).

The machine learning model associated with the recommendation service 142 may also receive as input media content selections, media content preferences, and media content sub-portions from a creator, in some implementations. In some implementations, the media content selections may be provided by a content creator, artist, or another user. In one example, the media content selections are selections may by a creator, and may include media content selections that the creator wishes to include in future recommendations by the recommendation service 142. Furthermore, in some implementations, the media content preferences may be provided by a content creator, artist, or another user. In one example, the media content preferences may include media content representations that the creator wishes to include as optional representations 152 that may be provided to a user. Moreover, in some implementations, the media content sub-portions may be provided by a content creator, artist, or another user. In one example, the media content sub-portions may be shortened "clips" or "samples" or other similar sub-portions of a media content item to be previewed by a user. In an additional example, the shortened clips may be a sub-portion of a media content item that the creator has selected to be previewed or otherwise highlighted to a user.

For example, and without limitation, the recommendation service 142 may be deployed as a recommender system deriving the media content recommendations 148 based on training to ascertain user preference through both implicit and explicit feedback. In some implementations the recommender system is re-trained periodically, re-trained based on deviation from ground truths, or otherwise re-trained to provide improved recommendations. Furthermore, recommendation service 142 may include other forms and structure of models in some example implementations. Output from any of the associated models may drive determination of media content recommendations 148 for generation of playlists for a user account by the media service 140 or another service.

In some implementations, the recommendation service 142 may operate to determine recommendations based upon a predicted enjoyment of a user associated with a user account. The predicted enjoyment may be categorized based upon different factors such as intent of a listening session (e.g., active listening or passive listening), mood or feelings of a current user, activity indication of the user device (e.g., GPS motion, step data, accelerometer data, etc.) and other factors.

In some implementations, the recommendation service 142 may also operate to determine recommendations based on various types of recommendations. For instance, types of recommendations may include explicit recommendations, implicit recommendations, and exploratory recommendations.

Explicit recommendations may be based on what a user listened to in a last session (e.g., high probability that the user wants the same experience) and/or what a user has searched or added to a personal or account collection of media content items, to name a few examples.

Implicit recommendations may be based, for example, on new content from artists the user has previously listened to, older content from artists the user has previously listened to, content associated with other users having similar listening habits (e.g., through clustering or other similarity measures), and/or recently added content in online playlists the user may have accessed.

Exploratory recommendations may be based on different factors, such as viral content, editorial recommendations, popular content, unknown content (e.g., to gauge interest in a genre, artist, or other content that the user has not yet listened to), or other similar factors.

The recommendation service 142 may also operate to provide recommendations based on device type, user type (e.g., paying or non-paying), location data (e.g., work, home, gym, GPS-based locations, etc.), direct feedback during listening, and other explicit/implicit features that may be ascertained by the recommendation service 142 through polling of data from the user device 102, or accessing data associated with the user device 102 or user account ID 110.

The recommendation service 142 may also operate to provide recommendations based on content creator selections, preferences, and sub-portions (e.g., "clips" or "previews"). For example, the recommendation service 142 may provide recommendations that include content creator preferences, such that user feedback related to those recommendation may be used to create additional feature sets for future training of an underlying recommender machine learning model. For example, if a user selects, highlights, saves, favorites, or otherwise indicates positive or negative responses to recommendations based on a particular content creator's selected preferences, future recommendations may be improved such that a user increases an amount of control over how future recommendations for similar or related creators are presented. In this manner, a more robust and/or engagement-focused dataset for future user recommendations may be generated.

The media content recommendations 148 may include a list of media content items that are determined to be of interest to one or more users associated with the user account ID 110. The media content recommendations 148 may be provided to the media service 140.

The media service 140 may include computer executable code configured to implement one or more of the technologies and/or techniques described herein. In one implementation, the media service 140 is a back-end software service executing on one or more servers of the service provider network 104. In this example, the media service 140 provides back-end service to the media application 120, which serves as a front-end.

In one implementation, the media service 140 is a functional back-end and front-end providing access to media services of the service provider network as software-as-a-service (SaaS) platform. In this example, the media service 140 may be accessible to the user device 102 through a website, a mobile application, a desktop application, or other suitable program.

In one implementation, the media service 140 provides the functionality of the media application 120, as well as back-end functionality as described herein. In this example, the media application 120 may be used interchangeably with the media service 140.

For example, the media service 140 may receive, as input, the media content recommendations 148. Based on a ranking of the media content items in the media content items 148, the media service 140 may generate a plurality of playlists. The playlists may include a plurality of media content items 156 that are able to be retrieved from media content library 154. In some examples, a playlist may correspond to an album by a particular artist or artists, a list of media content items curated by the media service 140 (e.g., by a content curator, by artificial intelligence such as generative artificial intelligence, etc.), a list of content items curated by the listener user or another listener user or artist user, and so forth. The media service 140 may also receive as input other media content data 174.

In some implementations, the media content library 154 may be stored in a non-transitory computer readable memory (e.g., random access memory), a cache, a drive (e.g., a hard drive), a flash drive, a database system, or another type of component or device capable of storing data. The media content library 154 may also include multiple storage components (e.g., multiple drives or multiple databases) that may also span multiple computing devices (e.g., across multiple server computers, in a distributed storage system, etc.).

The media service 140 may be configured to provide the media content item(s) 156 and the user interface 158 to the user device 102. Additionally, the media service 140 may be configured to provide representation(s) 152 of the media content items 156 to the user device 102.

In some implementations, the representation(s) 152 may include dynamic information based on the media content playback history associated with the user account. For example, a user playback history may be used to determine representations of interest to a user associated with the user account. The dynamic information may include, for example, lyrics of a song, associated album reviews, artist biographies, production credits, producer data, label data, and/or charting history.

In some implementations, the representation(s) 152 may include other representations based on a currently played media content item. For example, the representation(s) 152 may also include album art, art representing the current media content item, artist art, and other art or graphical displays presented within a user interface.

The representation(s) 152 may be retrieved from a representation library 150. In some implementations, the representation library 150 may be stored in a non-transitory computer readable memory (e.g., random access memory), a cache, a drive (e.g., a hard drive), a flash drive, a database system, or another type of component or device capable of storing data. The representation library 150 may also include multiple storage components (e.g., multiple drives or multiple databases) that may also span multiple computing devices (e.g., across multiple server computers, in a distributed storage system, etc.).

Upon presenting the user interface 158 and playback of media content 156, the listener user may perform a gesture input, such as a single gesture input or a multiple gesture input, at the user device 102. The gesture input 112 and any other user selection(s) 114 may be transmitted to the media service 140 over the network 106.

Responsive to the gesture input 112, the media service 140 may automatically select a new media content item and representation to transmit to the user device 102. For example, the media service 140 may automatically select a media content item from a current playlist or a different playlist based on a direction and/or type of gesture input 112.

The media service 140 may transmit the new representation 152 and the new media content item 156 to the user device 102. The media service 140 or the media application 120 may initiate playback of the new media content item 156 and display of the representation 152 at the user device 102.

As described above, the system 100 provides media content navigation user interfaces. Based on a user account ID 110, the recommendation service 142 may provide media content recommendations 148 to the media service 140. The media service 140 may provide a user interface 158, one or more media content items 156, and representation(s) 152 to the media application 120. The media application 120 may automatically initiate playback of the received media item and presentation of the user interface 158. In this manner, the media application 120 may initiate playback without requiring a "landing page" or other navigation/selection by a user.

During playback, the listener user may input a gesture input 112 (e.g., such as a single gesture input) to change media content items for playback. Based on the gesture input 112, the media service 140 may select a new media item 156 and representation 152, and provide the new media item 156 and representation 152 for playback and display, respectively, at the user device 102. Other gesture inputs 112 provided by the listener user during playback may cause other changes to playback, including changes to a current playlist, changes to a displayed representation, and others. In this manner, the media application 120 is navigable by a user through different gestures, such that a user may use a gesture to switch playlists, as well as skip and restart/replay a previous song in a current playlist with a different gesture, select new songs, view different representations (e.g., lyrics, art, etc.), without distractions associated with viewing options and selecting the options directly. Other variations of these operations may also be applicable.

For example, in some implementations, the media service 140 may provide some or all of the functionality of the media application 120.

For example, in some implementations, the media application 120 may provide some or all of the functionality of the media service 140.

Hereinafter, functionality associated with the above-described operating environment is described in detail.

Figure 2:
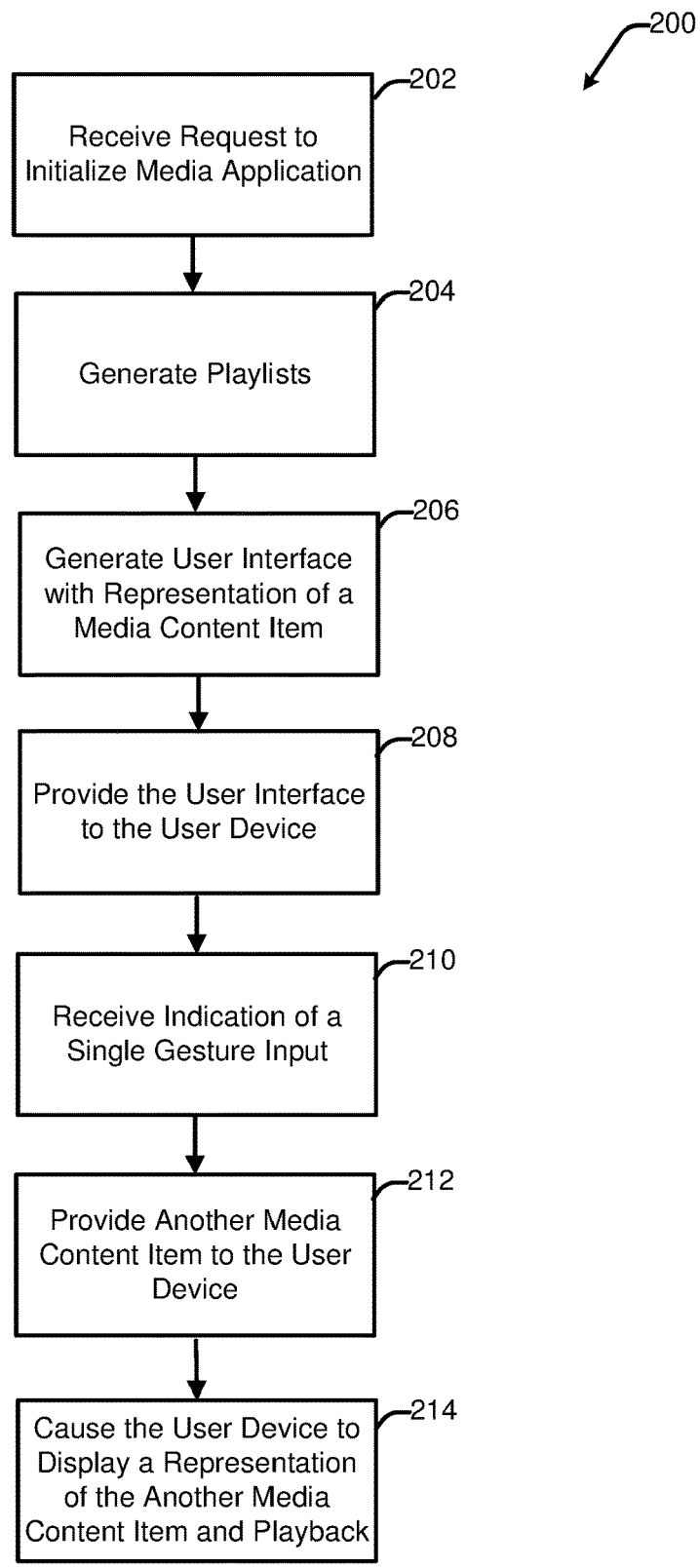
FIG. 2 is a flowchart showing aspects of a method for media content item playback and navigation, according to an implementation presented herein.

FIG. 2 is a flowchart showing aspects of a method 200 for media content item playback and navigation, according to an implementation presented herein. Method 200 may be performed during initialization of a media application at a user device. The user device may be in communication with a media service over a network. Method 200 may begin at block 202.

At block 202, a request to initialize a media application at a user device is received. In some implementations, the request includes a user account ID or other identifying data. The user account ID may be associated with a user account, which in turn may be associated with a user device. The user device may originate the request to initialize the media application. Block 202 may be followed by block 204.

At block 204, playlists are generated based on the user account ID. For example, in some implementations, two or more playlists are generated. The two or more playlists may include a plurality of media content items selected automatically by a media service based upon media content recommendations provided by a recommendation service. The recommendation service may include a machine learning model trained on both implicit and explicit feedback of user preferences and playback history associated with the user account. Block 204 may be followed by block 206.

At block 206, a user interface is generated. The user interface may include a representation of a media content item from a playlist. In some implementations, the user interface is generated by a media service and transmitted to the user device. Block 206 may be followed by block 208.

At block 208, the user interface, the representation, and the media content item are provided to the user device. In some implementations, the user interface comprises the representation. In some implementations, a media application on the user device initiates playback of the media content item upon receipt without further input. In this manner, the media content item may be automatically played back when provided to the user device. In at least some cases, the media application presents the user interface and begins playback of the media item upon initiation of the media application at the user device, without first presenting a landing page and manual selection of the media content item by the user for playback. Block 208 may be followed by block 210.

At block 210, an indication of a gesture input is received. The gesture input may include a single gesture input or a multiple gesture input. In this example, a single gesture input may be received from the user device. For example, a user may swipe against a touch-sensitive display of the user device displaying the user interface. In some implementations, the single gesture input includes a direction and a force and/or duration associated therewith.

The gesture input may be configurable by a user of the user device, such that different directions indicate a different outcome. For example, a first direction may indicate a change from the current playlist to a different playlist. Other directions and attributes may be applicable and are described in more detail below with reference to FIG. 3. Block 210 may be followed by block 212.

At block 212, responsive to the gesture input, another media content item from a different playlist is provided to the user device. For example, if the direction of gesture represents indication to transition from the media content item being played on the current playlist to a new playlist, a media service may automatically select a new media content item from a different playlist to provide to the user device. Block 212 may be followed by block 214.

At block 214, the user device is caused to display another representation associated with the new media content item from the new playlist, and is caused to playback the new media content item. In this manner, gesture inputs may be used to traverse different playlists at a user device.

The direction of the gestures may indicate a new playlist to traverse to implicitly, through application of varying force and/or duration of contact by a user. As the force and/or duration of the gesture increases, the media service may skip one or more playlists to more dramatically change content being played back. In an example where the force of the gesture is relatively smooth and/or consistent, and/or the duration of the gesture takes less time (e.g., less than one second), the media service may traverse to an adjacent playlist. Concepts including playlist adjacency and skipping of playlists is described more fully with reference to FIGS. 5-6.

As described above, methods of media content navigation include initializing a media application, and playback of a media content item automatically. The currently played media content item may be changed through application of a gesture input having force and/or direction and/or duration.

Hereinafter, a method of navigating media content items with different input gestures is described more fully with reference to FIG. 3.

Figure 3:
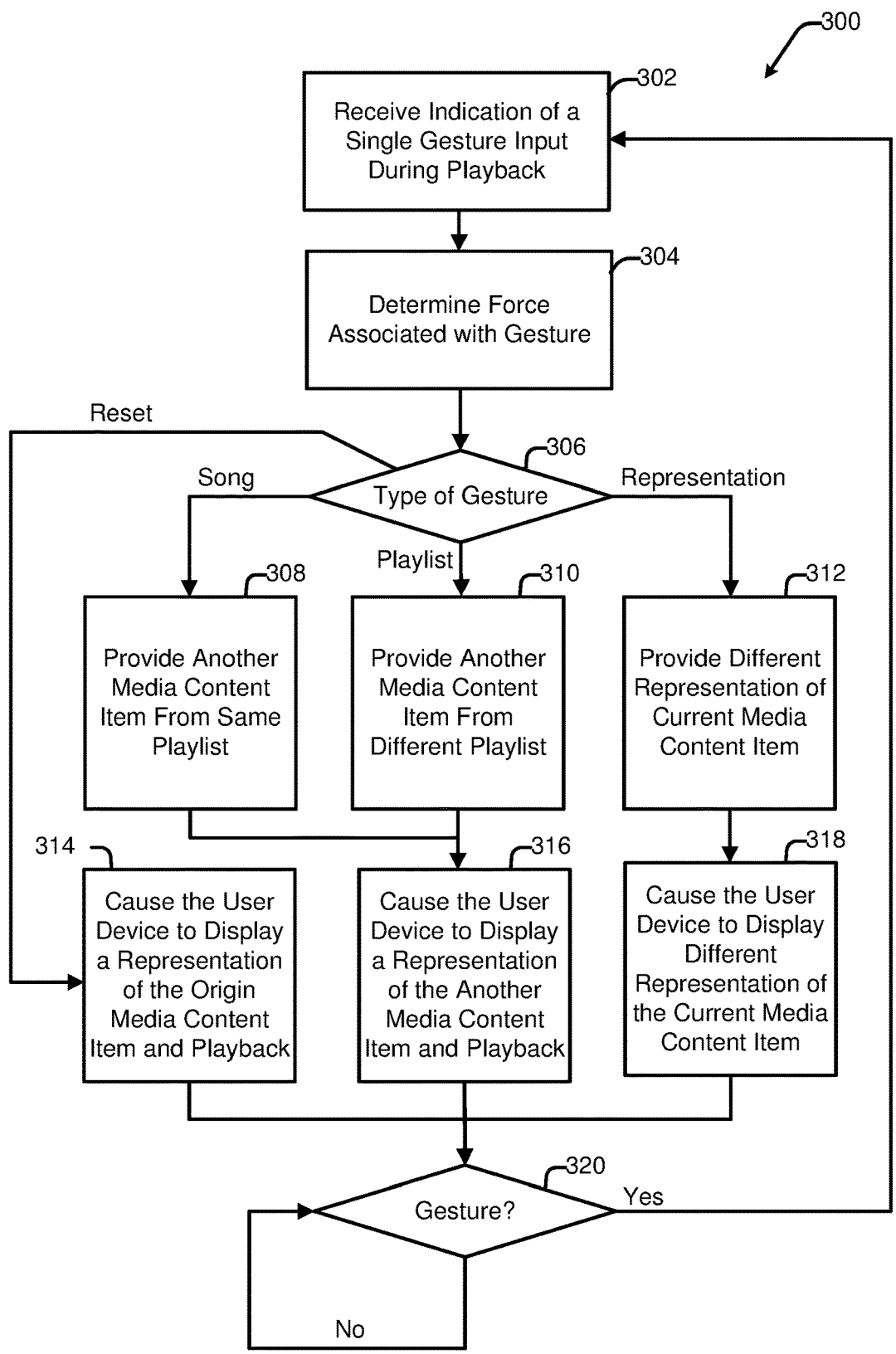
FIG. 3 is a flowchart showing aspects of a method for media content navigation using gesture inputs, according to an implementation presented herein.

FIG. 3 is a flowchart showing aspects of a method 300 for media content navigation using gesture inputs, according to an implementation presented herein. Method 300 may be performed during playback of media content items at a user device implementing techniques described herein. Method 300 may begin at block 302.

At block 302, an indication of a gesture input is received during playback of a media content item. The gesture input may include a single gesture or multiple gestures, in some implementations. The media content item may be played back with a media application executing on the user device. The gesture input may be input at the user device, by a user swiping a touch-sensitive display of the user device. Block 302 may be followed by block 304.

At block 304, a force and/or duration associated with the gesture input may be determined. For example, a magnitude of pressure, a velocity of the gesture, and/or other aspects of the gesture may be output by hardware components and/or software components of the user device associated with an input interface of the touch sensitive display. The force and/or duration may be determined based on the values output by the hardware and software components. Block 304 may be followed by block 306.

At block 306, a type of gesture and/or a direction of gesture may be determined. For example, a gesture input may comprise a single gesture input or a multiple gesture input. A In some implementations, a single gesture input may comprise a swipe in any direction, a tap, a short press, a long press, a pincer or pinch gesture (e.g., inward with two or more appendages), a spread gesture (e.g., outward with two or more appendages) or another single gesture. Alternatively or additionally, multiple gesture inputs are considered, which may include actions such as (but not limited to), multiple distinct swipe gestures, multiple tap gestures, multiple press gestures (e.g., for greater than a threshold duration), or combinations of individual or multiple of these gesture types. The user device may include onboard software and hardware components configured to discern the direction and force and/or duration of the input gesture.

In some implementations, gestures and associated functions may be adjusted by a user of the user device such that different gestures are associated with different navigational controls. In some implementations, control actions can include a reset action, a song change action, a playlist change action, and a representation change action. It is noted that these actions may be bidirectional in some implementations.

A bidirectional action is an action that causes one control action in a first direction, and a second control action in a different or opposite direction. For example, a first control action may be indicated with a left swipe, a second control action with a right swipe, a third control action with an upwards swipe, a fourth control action with a downwards swipe, and so on. Furthermore, a pinch control action may be different than a widening outward movement opposite to a pinch. These and other control actions may be user selectable and adjustable depending upon user preferences.

Block 306 may be followed by one of blocks 308, 310, 312, or 314, based upon the received gesture input. For example, block 308 may be triggered by a song change gesture, block 310 may be triggered by a playlist change gesture, block 312 may be triggered by a representation change gesture, and block 314 may be triggered by a reset or "go-back" gesture.

Block 308 may include providing another media content item from the same playlist. For example, the song change gesture may operate to change between songs on the same playlist. In some implementations, changing the direction of the song change gesture moves forwards and backwards through a playlist. Block 308 may be followed by block 316.

Block 316 may include causing the user device to display a representation of the another media content item and playback of the another media content item from the same playlist.

Block 310 may include providing another media content item from a different playlist. For example, the playlist change gesture may operate to change between playlists. In some implementations, changing the direction of the playlist change gesture moves forwards and backwards through a plurality of playlists recommended by the recommendation service 142 for a user account. Block 310 may be followed by block 316, described above.

Block 312 may include providing a different representation of a currently played media content item. For example, the representation change gesture may operate to display different representations of the media content being played back. The representations may vary depending upon the underlying media content item.

In some implementations, the representations may include dynamic information based on the media content playback history associated with the user account. For example, a user playback history may be used to determine representations of interest to a user associated with the user account. The dynamic information may include, for example, lyrics of a song, associated album reviews, artist biographies, production credits, producer data, label data, and/or charting history.

In some implementations, user playback history and associated representations may be based on familiarity with the artist, familiarity with the content item, time spent using the media application and/or service provider network (e.g., if you're a new user and there is little playback history, "less familiar" information may be included in the representation), and others.

In some implementations, both user history and user account status may be used to determine different representations to display.

In some implementations, the representations may include lyrics, album reviews, artist biographies, credits, indication of who sampled the media content item (i.e., if it contains samples), where the item was recorded, "fun facts" about the item, awards the item/artist has won, producers, label, charting history, and others. Block 312 may be followed by block 318.

At block 318, the user device is caused to display different representations of the current media content item.

Block 314 may include causing the user device to display a representation of the origin media content item (e.g., the media content item played during receipt of the first input gesture), or a previous media content item, and cause the user device to resume playback of the media content item at a temporal location of when the first gesture input was received. For instance, if the first gesture received caused a navigation to a next content item in a same playlist, a gesture in an opposite direction may cause the user device to return to the previous song that was playing when the first gesture was received. In another example, if the first gesture received caused a navigation to a different playlist, a gesture in a different direction may cause the user device to return to the previous playlist and the specific media content item in the previous playlist that was playing when the first gesture was received. In this manner, the method 300 allows persistence in playback for a session, such that a user may revert back to previous state by inputting a reset gesture. This may be useful in scenarios where an input gesture was mistakenly input, as well as in other scenarios.

Blocks 314, 316, and 318 may be followed by block 320.

Block 320 may direct the method 300 to iterate back to block 302 upon receipt of a new gesture input. In this manner, the method 300 may repeat as necessary depending upon user interaction with the provided user interface.

As described above, different gesture inputs may direct different changes to the user interface, the currently played media content item, and others. Furthermore, gestures may be user adjustable, reversible, and/or based on user playback history, in some implementations.

Figure 4:
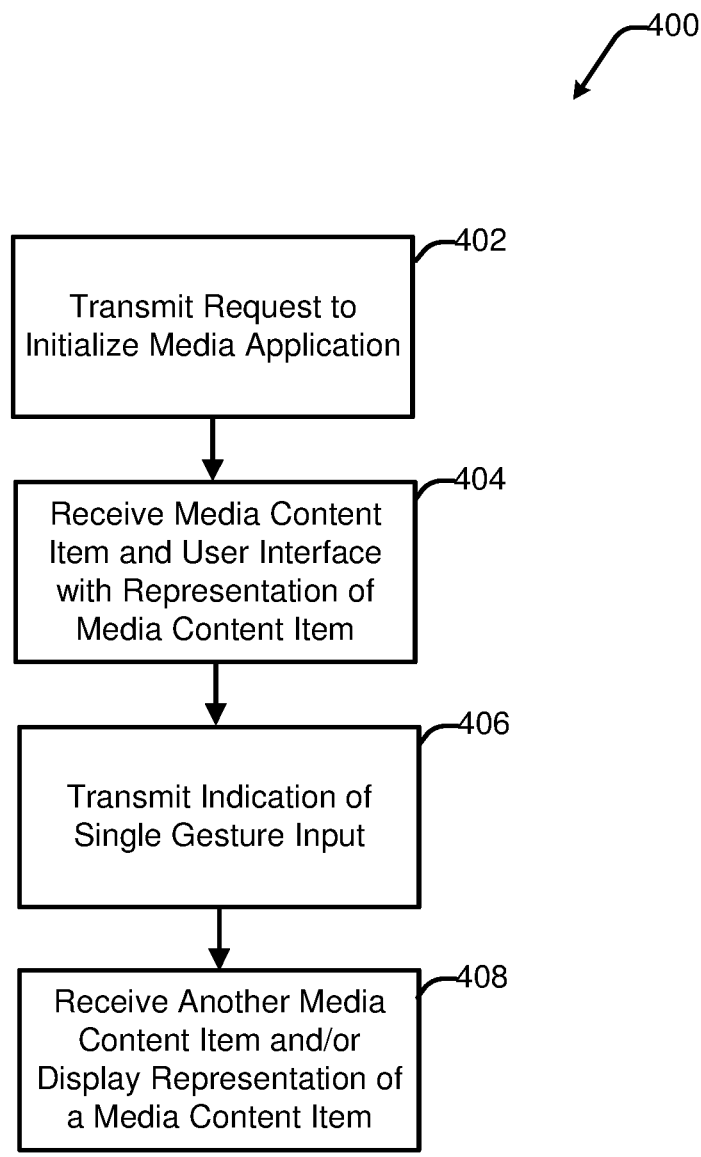
FIG. 4 is a flowchart showing aspects of a method for media content navigation on a user device, according to an implementation presented herein.

FIG. 4 is a flowchart showing aspects of a method 400 for media content navigation on a user device, according to an implementation presented herein. The method 400 may be performed at a user device executing software according to the techniques described herein. Method 400 may begin at block 402.

At block 402, a request to initialize a media application is transmitted from the user device. For example, the request may include a user account ID and may be initiated by a user of the user device opening a media application thereon. Block 402 may be followed by block 404.

At block 404, a media content item for playback and a user interface with a representation of the media content item are received at the user device. The user device may automatically initiate playback of the received media content item without further input from the user device, such as without presentation of a landing page or user selections of media content for playback via the landing page, in some implementations. Block 404 may be followed by block 406.

At block 406, an indication of a gesture input may be transmitted from the user device. For example, the indication of the gesture input may be transmitted to a service provider network and/or media service. Block 406 may be followed by block 408.

At block 408, another media content item and/or a representation of the current media content item may be received. For example, if the single input gesture was a representation change gesture, then a change in representation may be received. However, if the single input gesture was a song change gesture, playlist change gesture, or reset gesture, then a different media content item and representation may be received. In the example case of a reset gesture, the playback may be resumed at a temporal location stored at the user device, service provider network, or another location.

The user device may initiate playback of the received media content item and/or display of the representation automatically upon receipt or thereafter.

Figure 5:
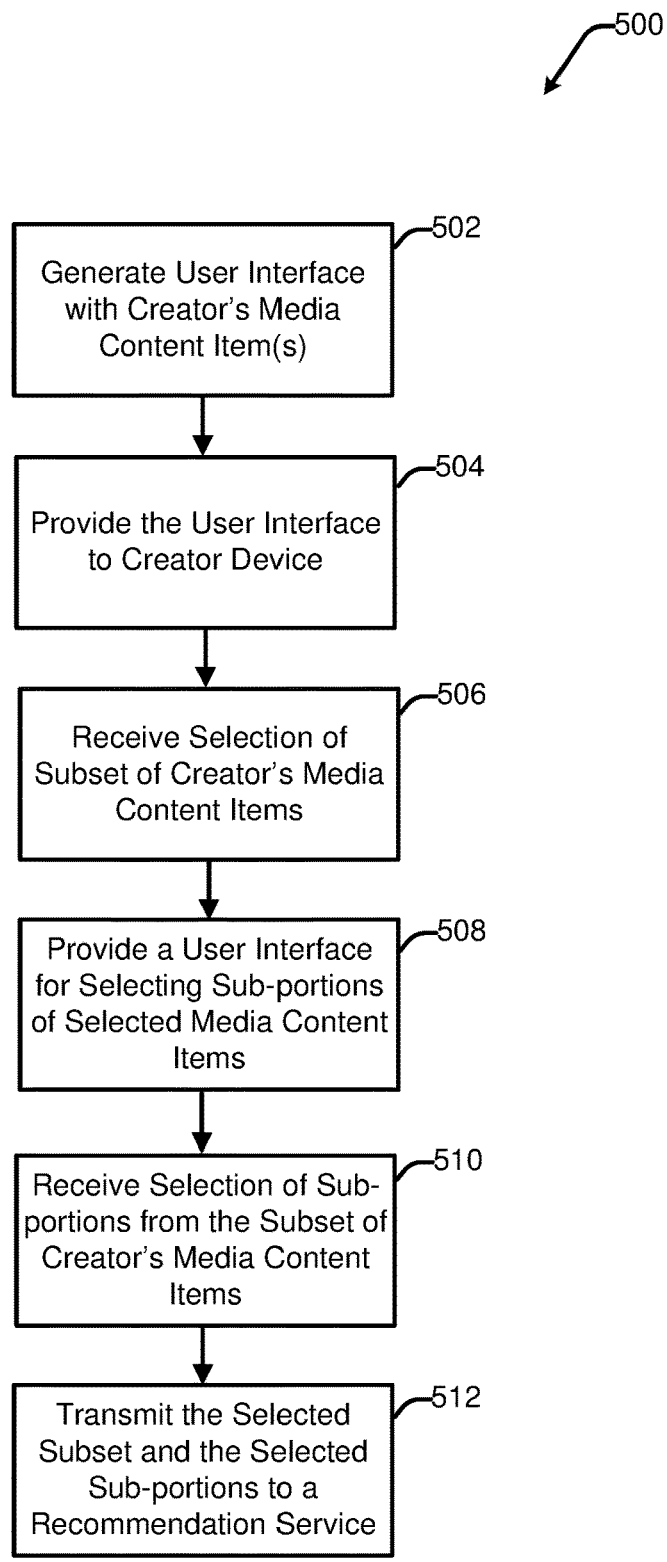
FIG. 5 is a flowchart showing aspects of a method for selecting media content recommendation preferences on a creator device, according to an implementation presented herein

FIG. 5 is a flowchart showing aspects of a method 500 for selecting media content recommendation preferences on a creator device, according to an implementation presented herein. The method 500 may be performed at a creator device executing software according to the techniques described herein. In some implementations, a creator device is similar to a user device or another computing device. Method 500 may begin at block 502.

At block 502, a user interface is generated with one or more media content items associated with a creator that is associated with the creator device. For example, the media content items may be identified with a user account ID of the creator, and may include several media content items ranked according to the creator's preferences. In some implementations, the media content items may be organized and presented according to an album, compilation, or other grouping. In some implementations, the other groupings may include charted songs, popular songs, new songs, and other suitable groupings. Block 502 may be followed by block 504.

At block 504, the user interface is provided to the creator device. The creator device may automatically initiate display of the received media content items presented on the user interface. Block 504 may be followed by block 506.

At block 506, a selection of a subset of the presented media content items may be received from the creator device. For example, a creator, using the presented user interface, may select one or more media content items from the display. These selections may be transmitted automatically and/or may be transmitted responsive to a request at the creator device, in some implementations. Block 506 may be followed by block 508.

At block 508, another user interface may be provided to the creator device. The another user interface may allow selection of sub-portions of the media content items. The media content sub-portions may be shortened "clips" or "samples" or other similar sub-portions of a media content item to be previewed by a user. In an additional example, the shortened clips may be a sub-portion of a media content item that the creator has selected to be previewed or otherwise highlighted to a user. Block 508 may be followed by block 510.

At block 510, the selection of sub-portions of the media content items may be received. For example, the selected sub-portions may be identified by timestamps of the selected portions such that the received selections include: an identification of a sub-portion of a media content items to be presented or played back at a user device as a preview or shortened "clip". The timestamps may include a start time of a clip and an end time of a clip. In some implementations, other forms of identifying data may be provided at block

510, such as a start time and duration, an end time and duration, or others. Block 510 may be followed by block 512.

At block 512, the selected subset of media content items, and the selected sub-portions of one or more of the selected media content items, may be transmitted to a recommendation service. For example, the recommendation service may use the creator preferences, selections, and sub-portions for improving recommendations based on the creator's selections. For example, the recommendation service may use the creator's selections to cause recommendations that include one or more of the selected subset of media content items in lieu of other media content items associated with the particular creator. For example, the recommendation service may provide an associated sub-portion or "clip" as a preview for a user device to playback. Other implementations and variations may also be applicable.

Responsive to receipt of the selections at block 512, a recommendation service may provide recommendations that include creator preferences. In some implementations, the recommendation service may generate more robust, action-oriented datasets for improving an underlying machine learning model when leveraging the provided creator selections as inputs. Moreover, in some implementations, the recommendation service may provide different recommendations when leveraging creator preferences, thereby improving monetization for some content creators.

Figure 6:
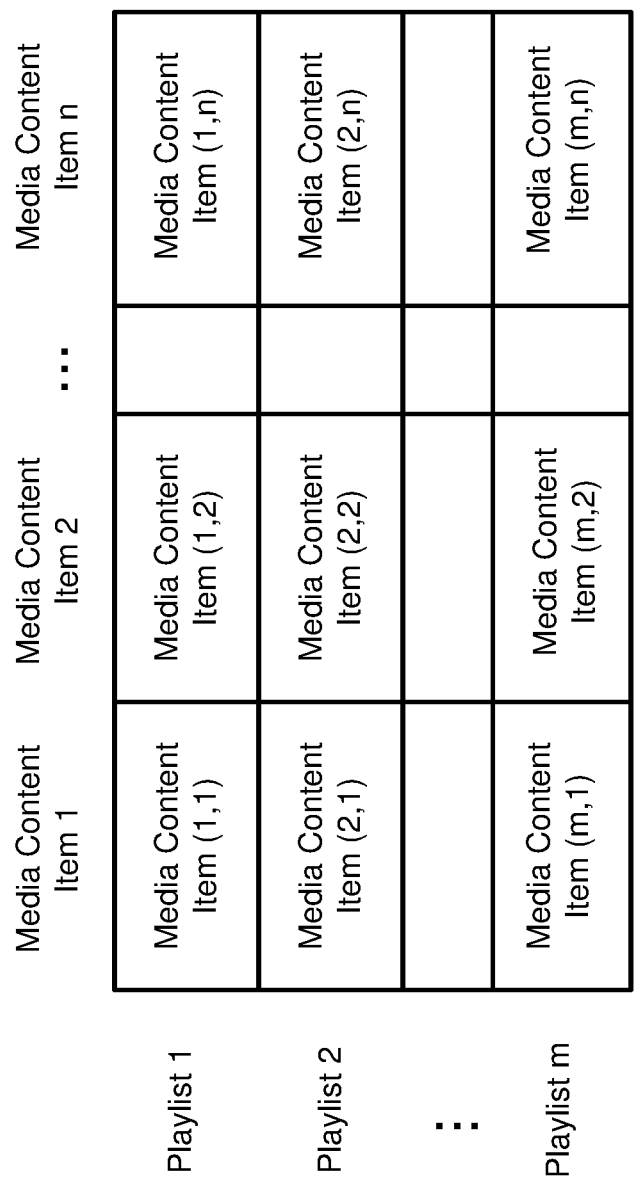
FIG. 6 illustrates an example two-dimensional media navigation data structure, according to an implementation presented herein.

FIG. 6 illustrates an example two-dimensional media navigation data structure 600, according to an implementation presented herein. The data structure 600 may be implemented by a media service providing user interfaces and playlists to a user device, in some implementations.

The data structure 600 may include a plurality of rows associated with a plurality of playlists. The data structure 600 may also include a plurality of columns associated with individual media content items of an associated playlist according to a row of the respective media content items.

As illustrated, individual elements in the data structure 600 may be addressed with a coordinate system (e.g., an x, y coordinate system). In this manner, the location of a media content item for playback at a user device is easily located based on a direction of an input gesture (e.g., a direction representing a direction to traverse the data structure) and in some cases, a force and/or duration of an input gesture (e.g., how far to skip forward across the data structure).

With regard to the data structure 600, according to some implementations, a distance from the origin (1, 1) denotes a disparity in content characteristics (e.g., genre, artist, style, tempo, etc.) or a change in familiarity in content.

For example, the distance along the x-axis from origin denotes changes in context from the onset of a playlist. This change in context may relate to the change in time of day, relative to a current time of day (or other context) as the user plays back individual items from the playlist. In some implementations, the changes in context may include transitions from morning listening, commute to work listening, workplace listening, commute home listening, workout listening, and so on, as time progresses within a same playlist. Other variations are also applicable, such as distance along the x-axis corresponding to similarity of audio characteristics to the first song, a date that songs were created relative to the first song, a recency that a song was explicitly selected by the user for playback, and so forth.

For example, the distance along the y-axis from origin denotes changes in a type/genre/mood associated with the playlist accessed. This change in type/genre/mood may be more dramatic the longer the distance from origin, such that a user may traverse to relatively unknown playlists and media content items by traversing further along the y-axis.

In some examples, the distance along the y-axis of the data structure may be associated with a time of day and/or activity. For instance, if the media application is launched at a time of day during a commute to work, a playlist associated with the commute to work can be initiated and correspondingly associated with the first row in the data structure. Continuing with this example, a playlist associated with workplace listening may be populated in a row proximate to the commute to work playlist, e.g., in the second row of the data structure, as the media service 140 determines from context data that workplace listening takes place at a time proximate to commute to work listening. Further to this example, the media service 140 may determine that workout listening often takes place several hours (and several activities) later than the commute to work listening, and thus the workout playlist may be further in the data structure (e.g., a sixth row) from the commute to work playlist when the application is launched at a time associated with a commute to work.

In some implementations, a level of force and/or duration and associated traversal of the data structure 600 may be a user adjustable setting. For example, as a force and/or duration of a gesture increases, the number of individual elements in the data structure 600 that are skipped over may increase, as well. The number of elements that are skipped may be a numerical value between 0 (e.g., typical force and/or duration applied) to a maximum number of skips (e.g., the maximum may be determined by the service provider and/or a user selectable setting).

In some implementations, the level of force and/or duration may indicate a degree of change between the currently played media content item and the new media content item selected by the input gesture. For example, the degree of change can be quantified by a number of playlists or media content items to skip over due to applied force, duration of force, and/or intensity.

Additionally, force-sensitive controls may be turned on/off by a user, or sensitivity may be adjusted.

In some implementations, the axis of media content items and playlists may be interchangeable.

Figure 7:
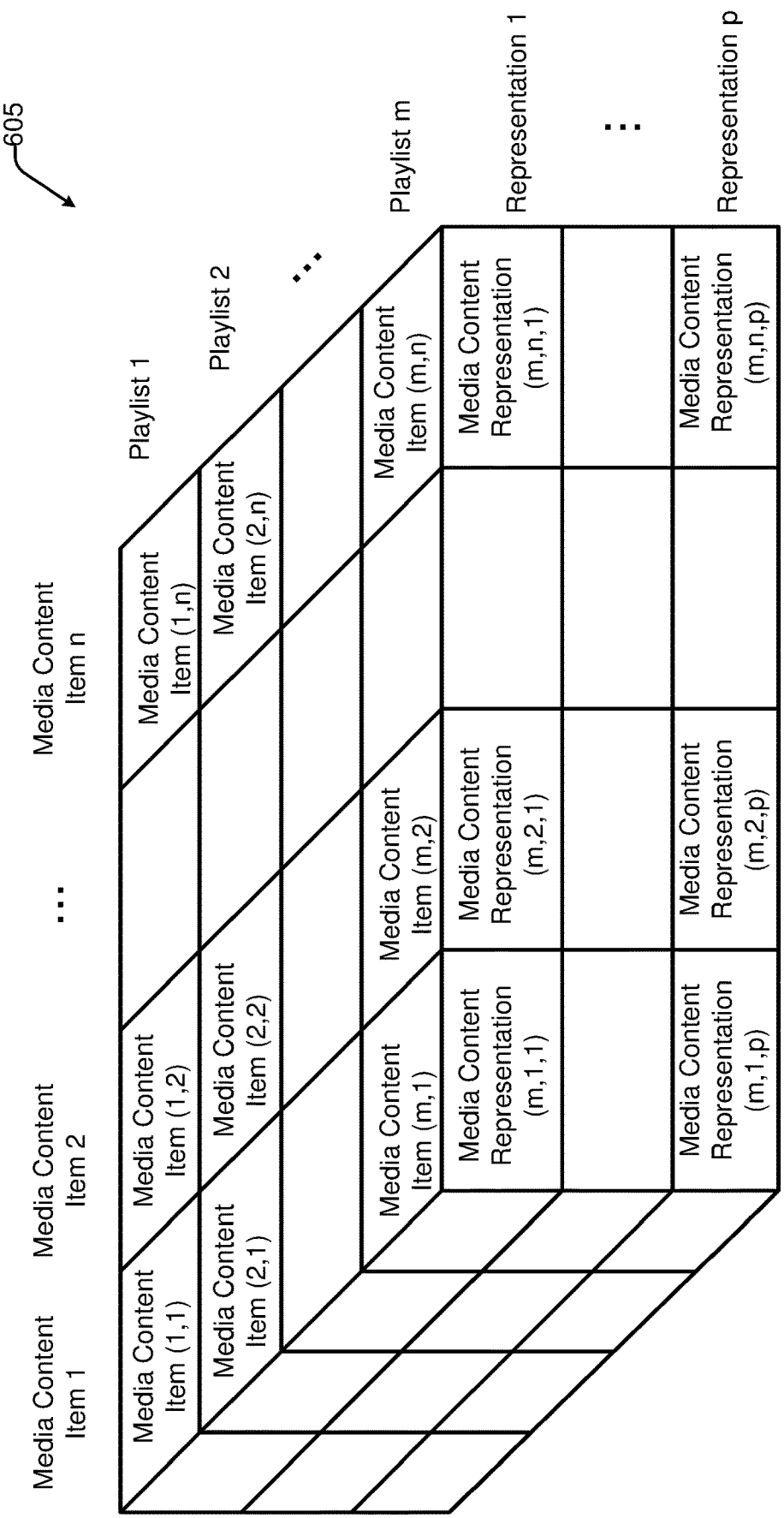
FIG. 7 illustrates an example three-dimensional media navigation data structure, according to an implementation presented herein.

FIG. 7 illustrates an example three-dimensional media navigation data structure 605, according to an implementation presented herein. The data structure 605 may be implemented by a media service providing user interfaces and playlists to a user device, in some implementations.

The data structure 605 may include a plurality of rows associated with a plurality of playlists. The data structure 605 may also include a plurality of columns associated with individual media content items of an associated playlist. The data structure 605 may also include a plurality of levels (e.g., in the z-direction) where each level includes a different type or granularity of representation.

With regard to the data structure 605, according to some implementations, a distance from the origin (1, 1, 1) denotes a disparity in content or a change in familiarity in content.

For example, the distance along the x-axis from origin denotes changes in context from the onset of a playlist. This change in context may relate to the change in time of day as the user plays back individual items from the playlist. Similar to the data structure 600, these changes may relate to different daily activities. The distance along the x-axis may correspond to other qualities as well, such as to similarity of audio characteristics to the first song, a date that songs were created relative to the first song, a recency that a song was explicitly selected by the user for playback, and so forth.

For example, the distance along the y-axis from origin denotes changes in a type/genre/mood associated with the playlist accessed. This change in type/genre/mood may be more dramatic the longer the distance from origin, such that a user may traverse to relatively unknown playlists and media content items to the user (e.g., not previously consumed by the user) by traversing further along the y-axis.

For example, the distance along the z-axis from origin denotes increases in granularity or resolution of representations displayed in the user interface as a corresponding media content item is being played back. The distance along the z-axis may also denote increases or decreases in familiarity with the representations. For example, as a user inputs gestures to further traverse along the z-axis, the representations may be more and more detailed, in some implementations. In some implementations, as a user inputs gestures to further traverse along the z-axis, more esoteric information such as chart history or producer awards may be displayed. Other variations are also applicable.

As illustrated, individual elements of the data structure 605 may be addressed with a three dimensional (x, y, z) coordinate system. In this manner, the location of a media content item for playback at a user device is easily located based on a direction of an input gesture (e.g., a direction representing a direction to traverse the data structure) and a force and/or duration of an input gesture (e.g., how far to skip forward across the data structure).

In some implementations, a level of force and/or duration and associated traversal of the data structure 605 may be a user adjustable setting. For example, as a force and/or duration of a gesture increases, the number of individual elements in the data structure 605 that are skipped over may increase, as well. The number of elements that are skipped may be a numerical value between 0 (e.g., typical force and/or duration applied) to a maximum number of skips (e.g., the maximum may be determined by the service provider and/or a user selectable setting).

In some implementations, the level of force and/or duration may indicate a degree of change between the currently played media content item and the new media content item selected by the input gesture. For example, the degree of change can be quantified by a number of playlists or media content items to skip over due to applied force, duration of force, and/or intensity.

Additionally, force-sensitive controls may be turned on/off by a user, or sensitivity may be adjusted.

In some implementations, the axis of media content items and playlists may be interchangeable.

Using the data structure 600, 605, or an alternative data structure (e.g., linked lists, variable arrays, and others), the techniques described herein may include translation of a direction of a gesture into traversal of the associated data structure. Further, the organization of the data structure into rows of playlists and columns of individual media content items within the playlist rows is readily comprehensible and intuitive for users to learn, navigate via minimal inputs, and keep track of during a playback session. Other methods of traversal, other forms of data structures, and different variations of the same are also applicable.

Figure 8:
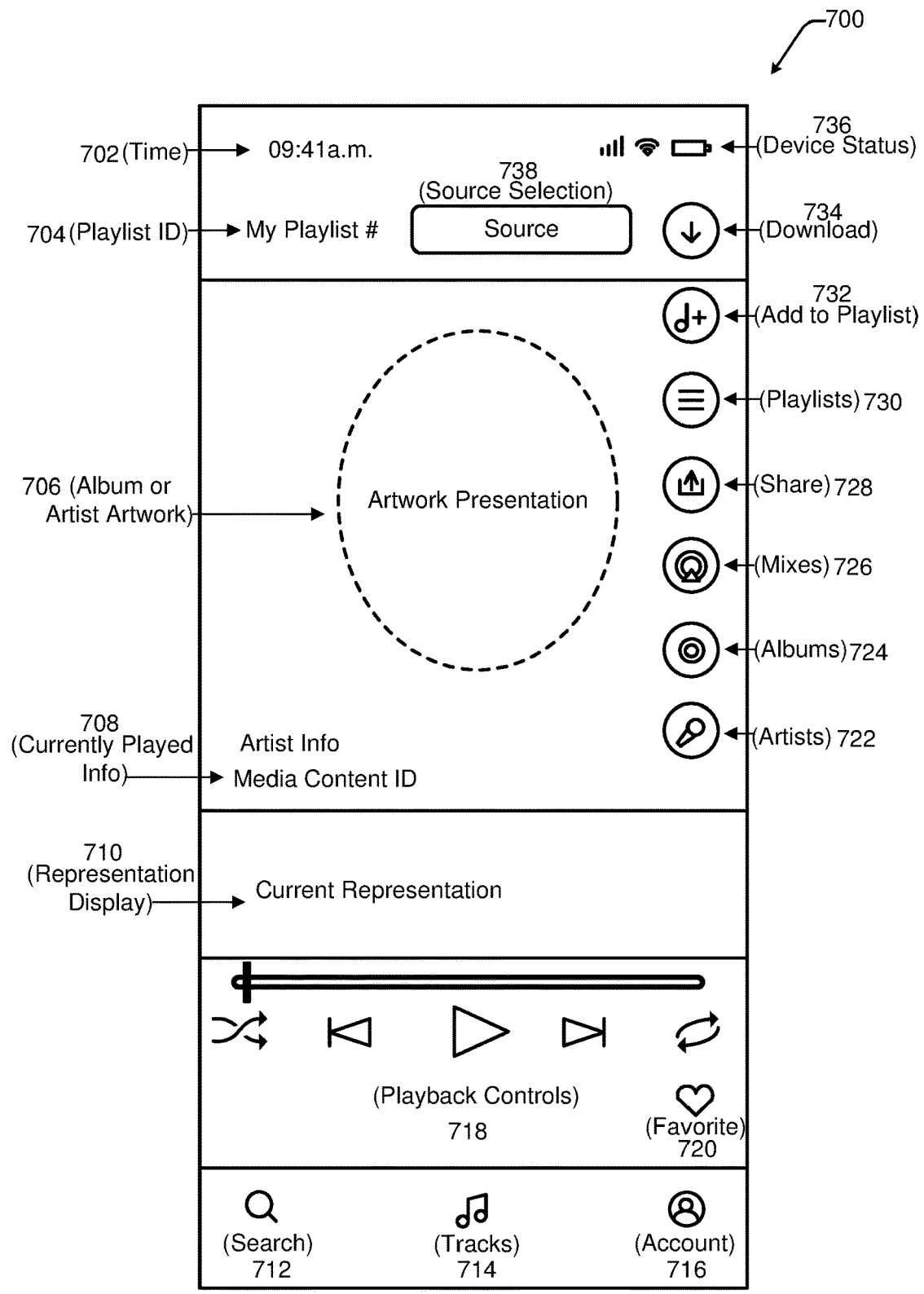
FIG. 8 is a schematic of a user interface for media content item listening, according to an implementation presented herein.

FIG. 8 is a schematic of a user interface 700 for media content item listening, according to an implementation presented herein. The user interface 700 may be rendered on a display device of a computing device, such as the user device 102, in some implementations. The display device may include any suitable display device, including, for example, a touch-screen computer monitor, touch-sensitive display screen, and/or other suitable touch-sensitive display device. It is noted that in some implementations, an accessibility device to aid in inputting gestures may be used in combination or in lieu of a touch-sensitive display device. Furthermore, other input devices capable of inputting gestures (e.g., electronic pens, mouses, trackpads, and others) may also be applicable.

The user interface 700 includes a display of a current time 702, a current playlist 704, album or artist artwork 706, and information about the currently played media content item 708. The current time 702 may be provided by a hardware clock or software clock on the user device. The current playlist 704 may be identified by a user designation (e.g., "my favorites for workouts") or by another designation. The album or artist artwork 706 may be retrieved from a third-party source, media content library, and/or metadata associated with the currently played media content item.

The user interface 700 also includes a representation display 710, search function 712, track selection function 714, and user account access 716. The representation display 710 may display representations of the currently played media content item. The representation display 710 may change based upon particular gesture inputs as described above. The search function 712 may initiate a text-input-display such that a user can input text or other data to use in a search of available media content items. Track selection function 714 may initiate track selection functionality of an album or playlist associated with the currently played media content. User account access may initiate access to change user preferences, update account information, update payment information, and others. In some implementations, user account access requires password protection and/or other secure techniques to secure user data.

The user interface 700 also includes playback controls 718 and favorite designation selection 720. The playback controls 718 may function similar to typical music playback controls. Furthermore, the favorite designation selection 720 may allow a user to provide explicit feedback related to the currently played media content item.

The user interface 700 also includes a device status 736, a download function 734, and a source selection 738. The device status 736 may include information received from the user device, software components executing thereon, and/or hardware components associated therewith. In at least one implementation, the device status 736 is controlled by an underlying operating system of the user device. The download function 734 initiates a download of the currently played media content item to the user device for offline playback.

The source selection 738 allows selection of different sources for playlist generation. In some implementations, the source selection 738 includes two or more optional data sources for media content items.

The user interface 700 also includes a plurality of optional floating interface elements. The floating interface elements may include artists selection 722, albums selection 724, mixes selection 726, share selection 728, playlists selection 730, and add-to-playlist selection 732. The floating interface elements may be optional. For example, FIG. 12 illustrates a simplified user interface without the floating interface elements.

The user interface 700 may be transmitted to a user device upon request, similar to the methods 200 and/or 300. Furthermore, use of the user interface 700 may generally follow the method 400, in some implementations. By implementing a gesture input, the display of the user interface 700 changes based upon the gesture. The below description of FIGS. 8A-11B depict different changes to user interfaces based upon different single input gestures.

Figure 9A:
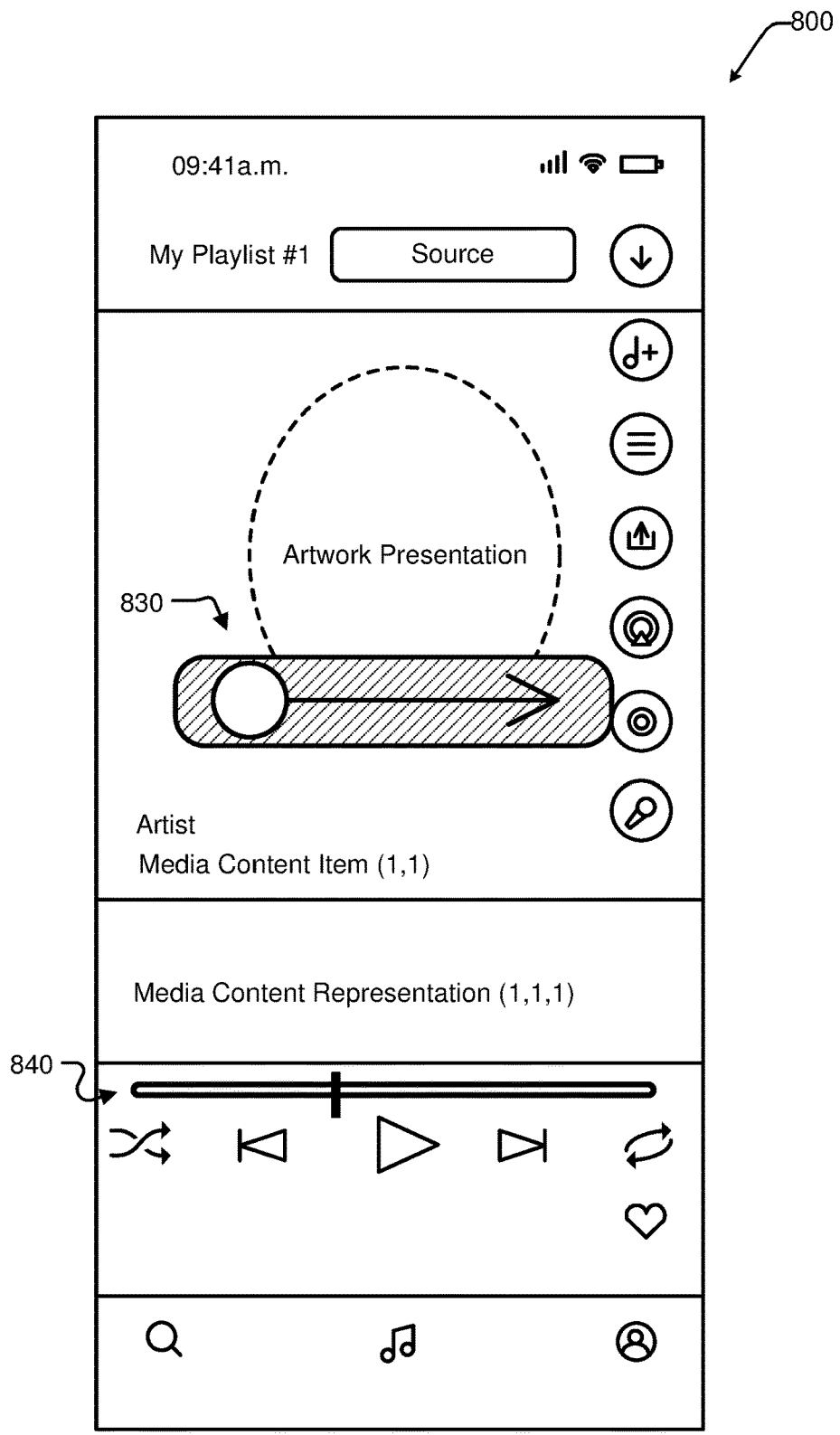
FIG. 9A illustrates media content navigation with a gesture input, according to an implementation presented herein.

FIG. 9A illustrates a media content navigation user interface 800 with a gesture input, according to an implementation presented herein. The user interface 800 may include the same or similar features as user interface 700. Like elements are denoted with the same reference numerals, and exhaustive or repetitive description of the same elements is omitted herein for the sake of brevity.

As shown in FIG. 9A, media content item (1,1) (e.g., a media content item of data structure 500 or 600 at position x=1 and y=1) is being played back at timestamp 840. Furthermore, a user has input a gesture input 830. The gesture input 830 is a swipe from left-to-right. Responsive to the gesture input 830, the user interface 800 changes to user interface 802.

Figure 9B:
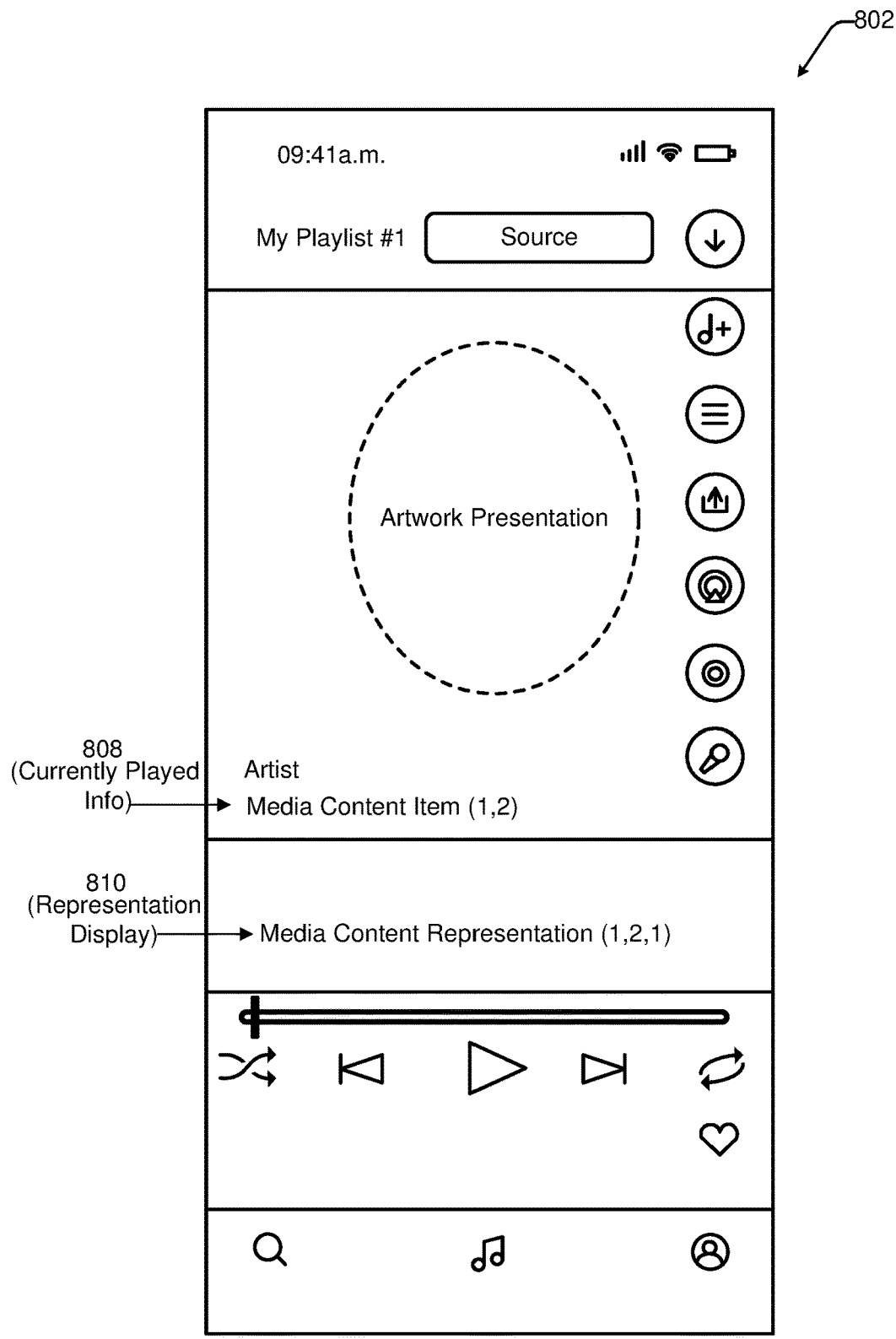
FIG. 9B illustrates media content navigation user interface changes due to a gesture input, according to an implementation presented herein.

FIG. 9B illustrates media content navigation user interface 802 with changes due to a gesture input, according to an implementation presented herein. The user interface 802 may include the same or similar features as user interfaces 700 and 800. Like elements are denoted with the same reference numerals, and exhaustive or repetitive description of the same elements is omitted herein for the sake of brevity.

As shown in FIG. 9B, the gesture input 830 has caused the media content item (1,2) (e.g., a media content item of data structure 500 or 600 at position x=1 and y=2) to play (e.g., see 808) and media content representation (1,2,1) (e.g., a media content representation of data structure 500 or 600 at position x=1, y=2, and z=1) to be displayed (e.g., see 810). Other gesture inputs may cause other changes.

Figure 10A:
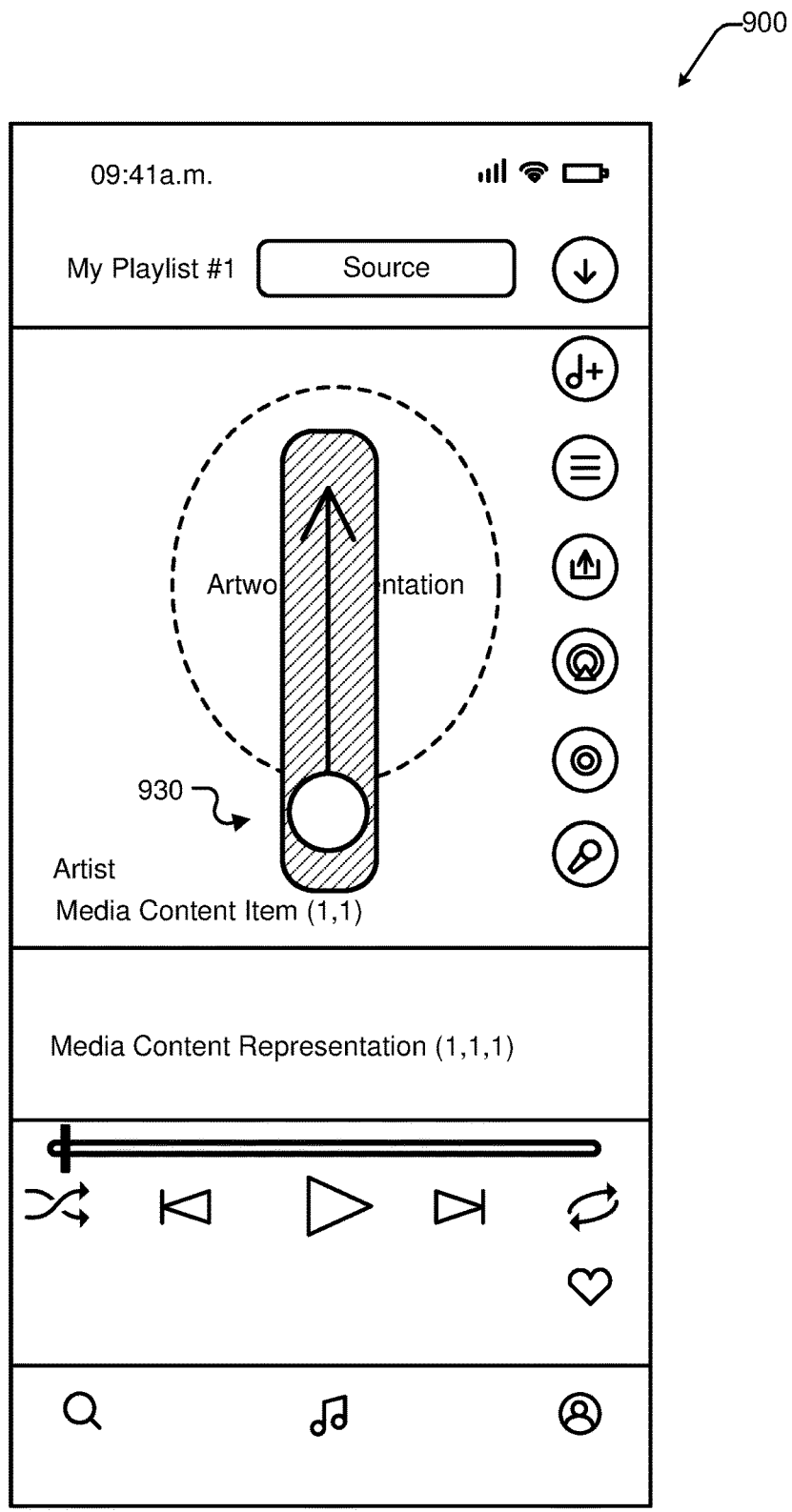
FIG. 10A illustrates media content navigation with a gesture input, according to an implementation presented herein.

FIG. 10A illustrates a media content navigation user interface 900 with a gesture input, according to an implementation presented herein. The user interface 900 may include the same or similar features as user interfaces 700, 800, and 802. Like elements are denoted with the same reference numerals, and exhaustive or repetitive description of the same elements is omitted herein for the sake of brevity.

As shown in FIG. 10A, playlist 1 and media content item (1,1) are being played back. Furthermore, a user has input a gesture input 930. The gesture input 930 is a swipe upwards. Responsive to the gesture input 930, the user interface 900 changes to user interface 902.

Figure 10B:
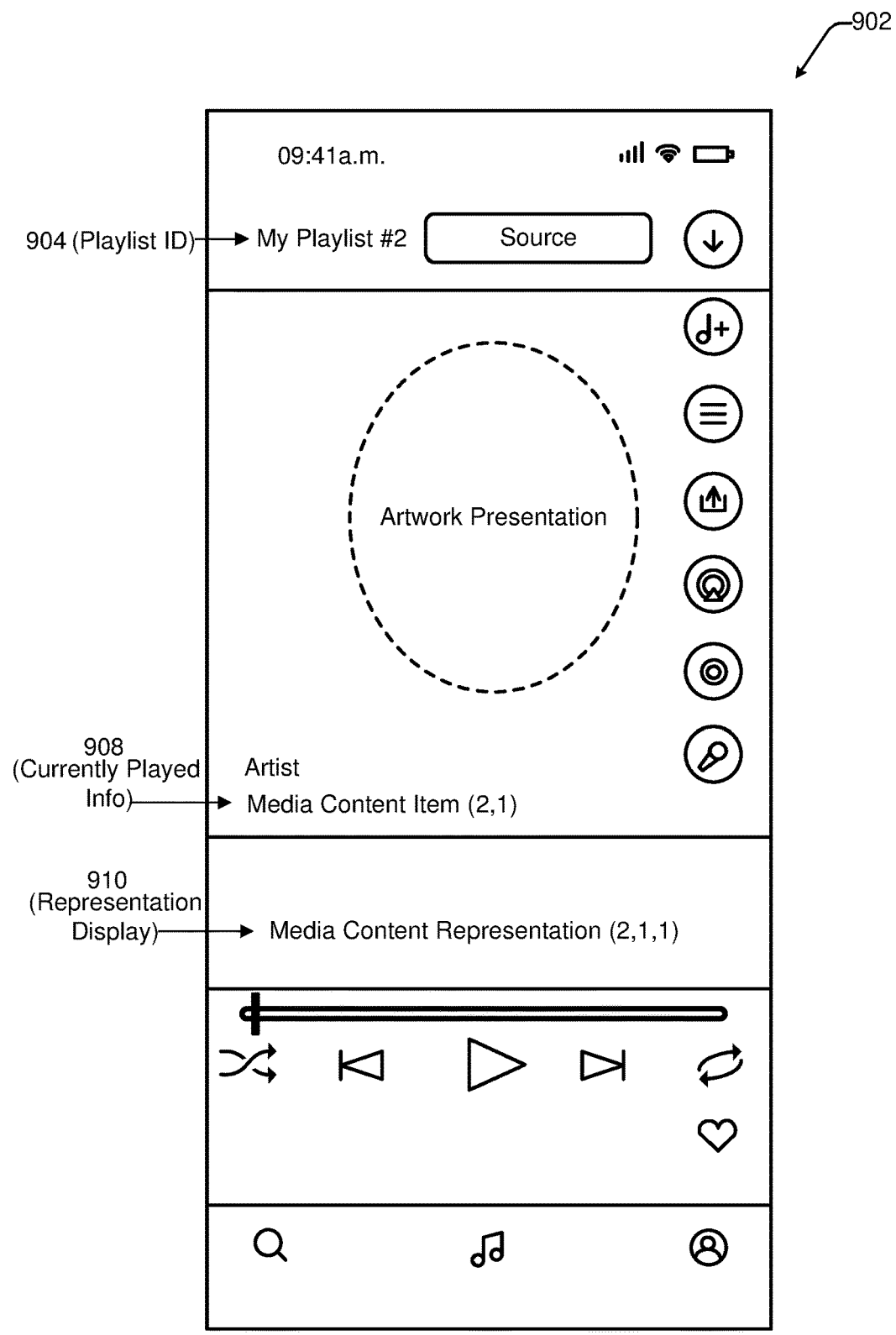
FIG. 10B illustrates media content navigation user interface changes due to a gesture input, according to an implementation presented herein.

FIG. 10B illustrates media content navigation user interface 902 with changes due to a gesture input, according to an implementation presented herein. The user interface 902 may include the same or similar features as user interfaces 700, 800, 802, and 900. Like elements are denoted with the same reference numerals, and exhaustive or repetitive description of the same elements is omitted herein for the sake of brevity.

As shown in FIG. 10B the current playlist has been updated to playlist 2 (e.g., see 904), the media content item has been updated to media content item (2, 1) (e.g., see 908), and the media content representation has been updated to (2,1,1) (e.g., see 910). Other gesture inputs may cause other changes.

Figure 11A:
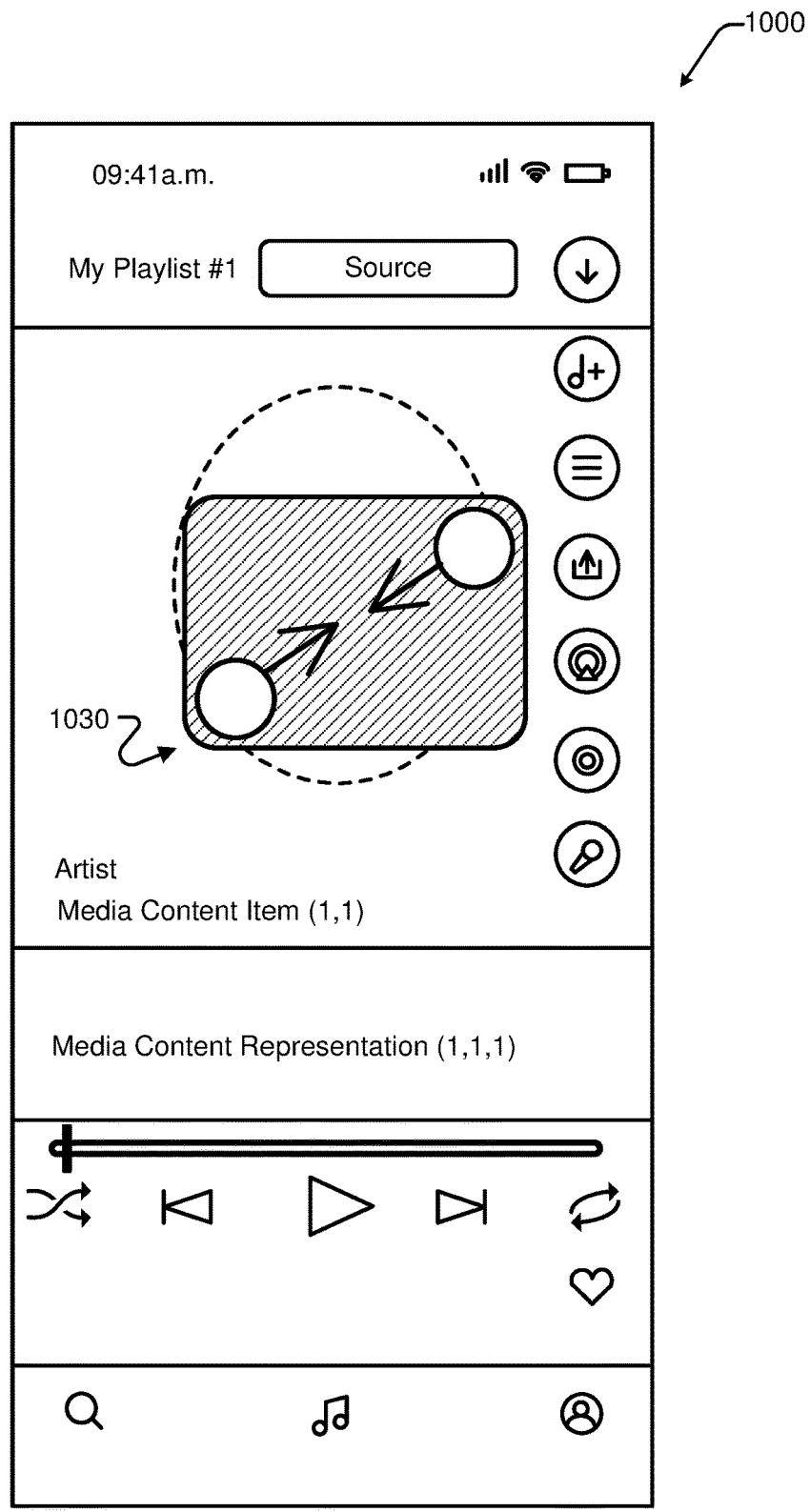
FIG. 11A illustrates media content navigation with a gesture input, according to an implementation presented herein.

FIG. 11A illustrates a media content navigation user interface 1000 with a gesture input, according to an implementation presented herein. The user interface 1000 may include the same or similar features as user interfaces 700, 800, 802, 900, and 902. Like elements are denoted with the same reference numerals, and exhaustive or repetitive description of the same elements is omitted herein for the sake of brevity.

As shown in FIG. 11A, media content representation (1,1,1) is being displayed and a gesture input 1030 has been input by a user. The gesture input 1030 is a pinch gesture pinching inwards. Responsive to the gesture input 1030, the user interface 1000 changes to user interface 1002.

Figure 11B:
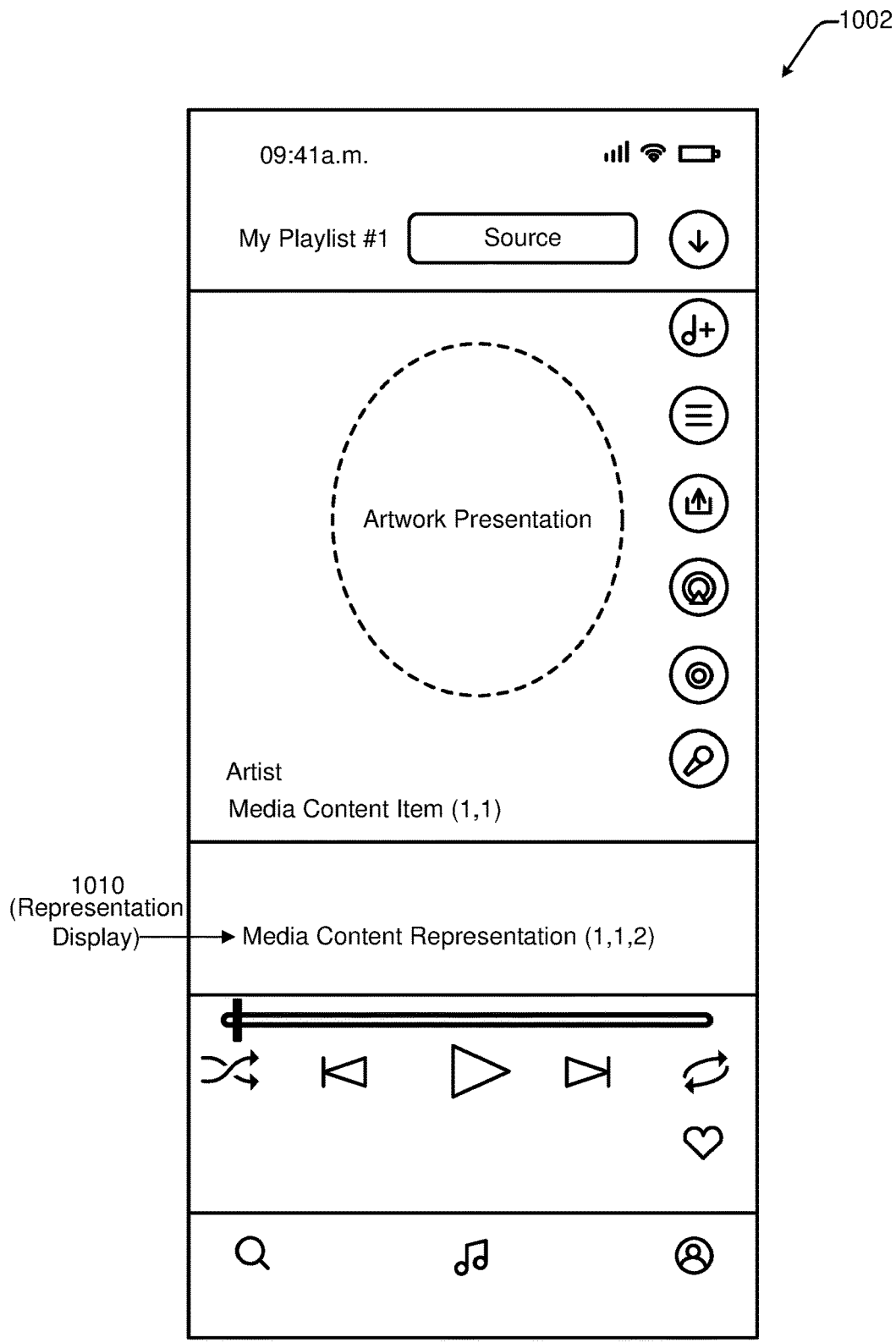
FIG. 11B illustrates media content navigation user interface changes due to a gesture input, according to an implementation presented herein.

FIG. 11B illustrates media content navigation user interface 1002 with changes due to a gesture input, according to an implementation presented herein. The user interface 1002 May include the same or similar features as user interfaces 700, 800, 802, 900, 902 and 1000. Like elements are denoted with the same reference numerals, and exhaustive or repetitive description of the same elements is omitted herein for the sake of brevity.

As shown in FIG. 11B, the media content representation has changes to media content representation (1,1,2) (e.g., see 1010). Other gesture inputs may cause other changes.

Figure 12A:
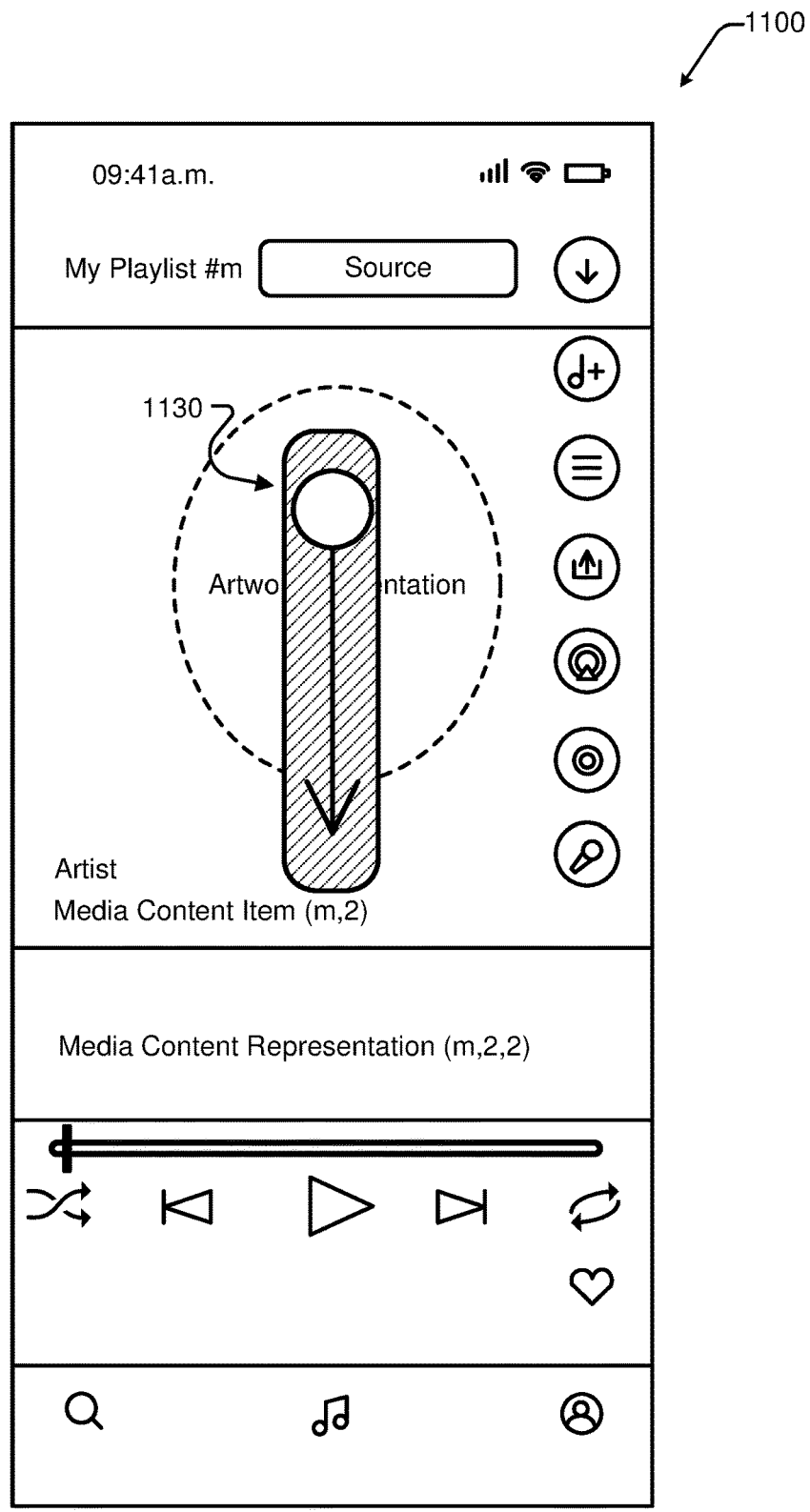
FIG. 12A illustrates media content navigation with a gesture input, according to an implementation presented herein.

FIG. 12A illustrates a media content navigation user interface 1100 with a gesture input, according to an implementation presented herein. The user interface 1100 may include the same or similar features as user interfaces 700, 800, 802, 900, 902, 1000, and 1002. Like elements are denoted with the same reference numerals, and exhaustive or repetitive description of the same elements is omitted herein for the sake of brevity.

As shown in FIG. 12A, a user device has played back a plurality of media content items and is currently playing back media content item (m,2) from playlist m. The media content representation (m,2,2) is currently displayed. Additionally, a single input gesture 1130 has been input by a user. The single input gesture 1130 is a downward swipe. Responsive to the single input gesture 1130, the user interface 1100 changes to user interface 1102.

Figure 12B:
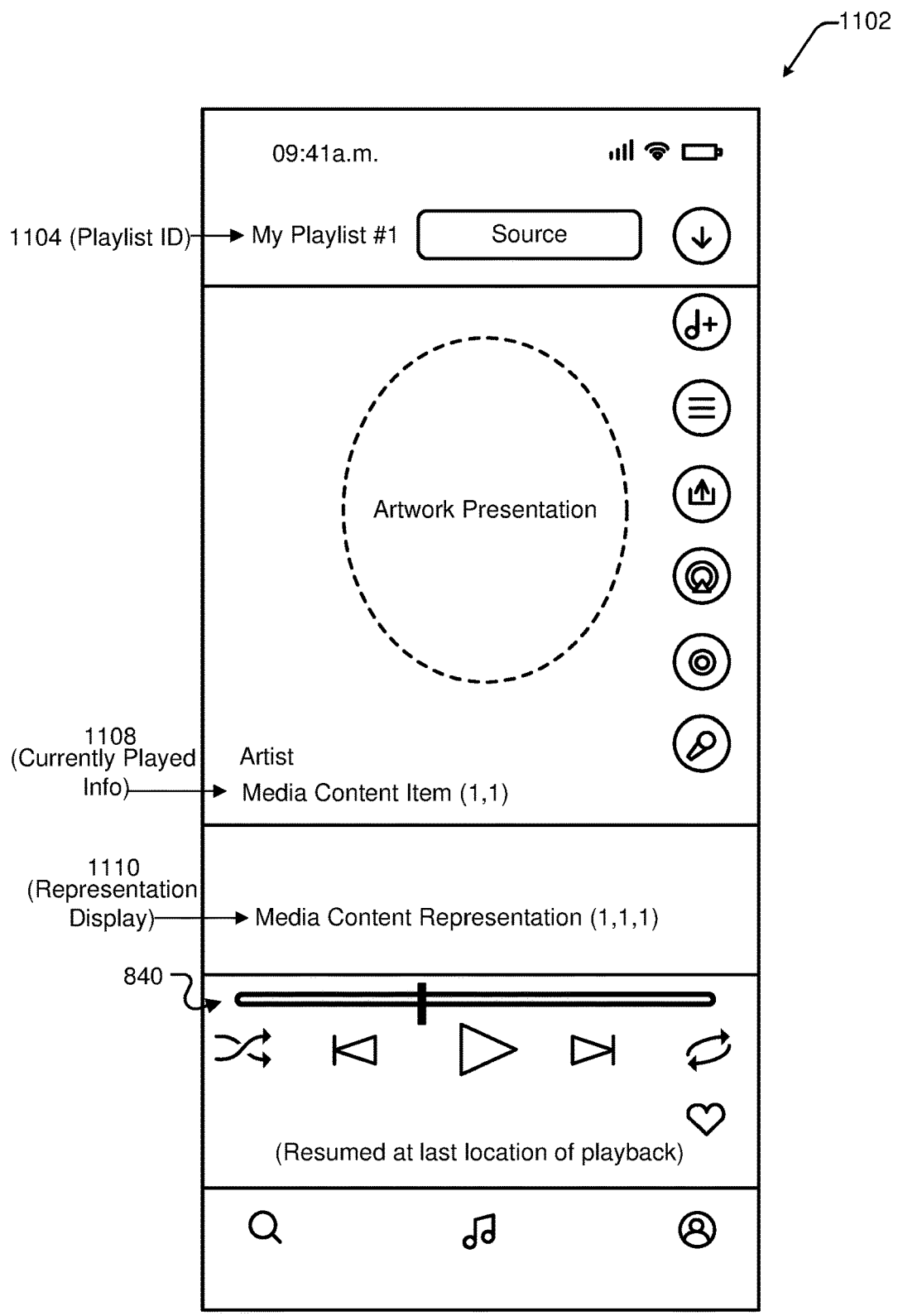
FIG. 12B illustrates media content navigation user interface changes due to a gesture input, according to an implementation presented herein.

FIG. 12B illustrates media content navigation user interface 1102 with changes due to a gesture input, according to an implementation presented herein. The user interface 1102 may include the same or similar features as user interfaces 700, 800, 802, 900, 902, 1000, 1002, and 1100. Like elements are denoted with the same reference numerals, and exhaustive or repetitive description of the same elements is omitted herein for the sake of brevity.

As shown in FIG. 12B, the current playlist has reverted back to playlist 1 (e.g., see 1104), the current media content item has reverted to media content item (1,1) (e.g., see 1108), the media content representation has reverted to media content representation (1,1,1), and playback of the media content item (1,1) has initiated at the last temporal location of playback denoted by timestamp 840. Turning back to FIG. 9A, the last temporal location of playback was also timestamp 840. In this manner, persistence in a media playback session may be implemented. Additionally, persistence may be implemented across multiple playback sessions. Furthermore, persistence may be a user-adjustable setting. Examples are also considered in which returning to a playlist that was previously being played is not based on a temporal location when departed from the previous playlist, such as by initiating playback from the beginning of the playlist again.

Figure 13:
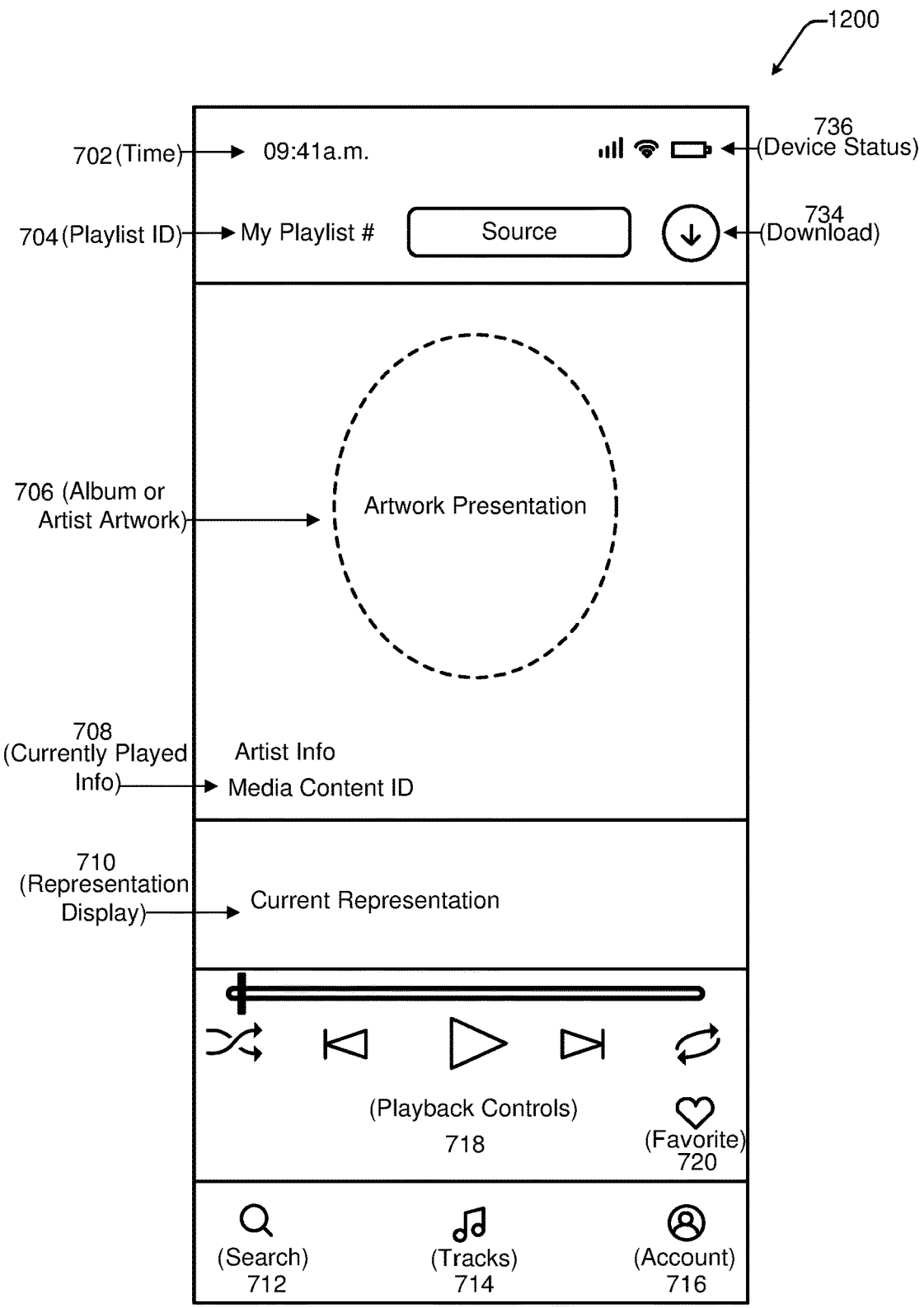
FIG. 13 is a schematic of a user interface for media content item listening, according to an implementation presented herein.

FIG. 13 is a schematic of a user interface 1200 for media content item listening, according to an implementation presented herein. The user interface 1200 may include the same or similar features as user interfaces 700, 800, 802, 900, 902, 1000, 1002, 1100, and 1102. Like elements are denoted with the same reference numerals, and exhaustive or repetitive description of the same elements is omitted herein for the sake of brevity.

As shown in FIG. 13, the user interface 1200 is substantially similar to user interface 700. Furthermore, user interface 1200 functions similar to user interface 700. However, user interface 1200 lacks the plurality of optional floating interface elements (e.g., illustrated in FIG. 8).

Figure 14:
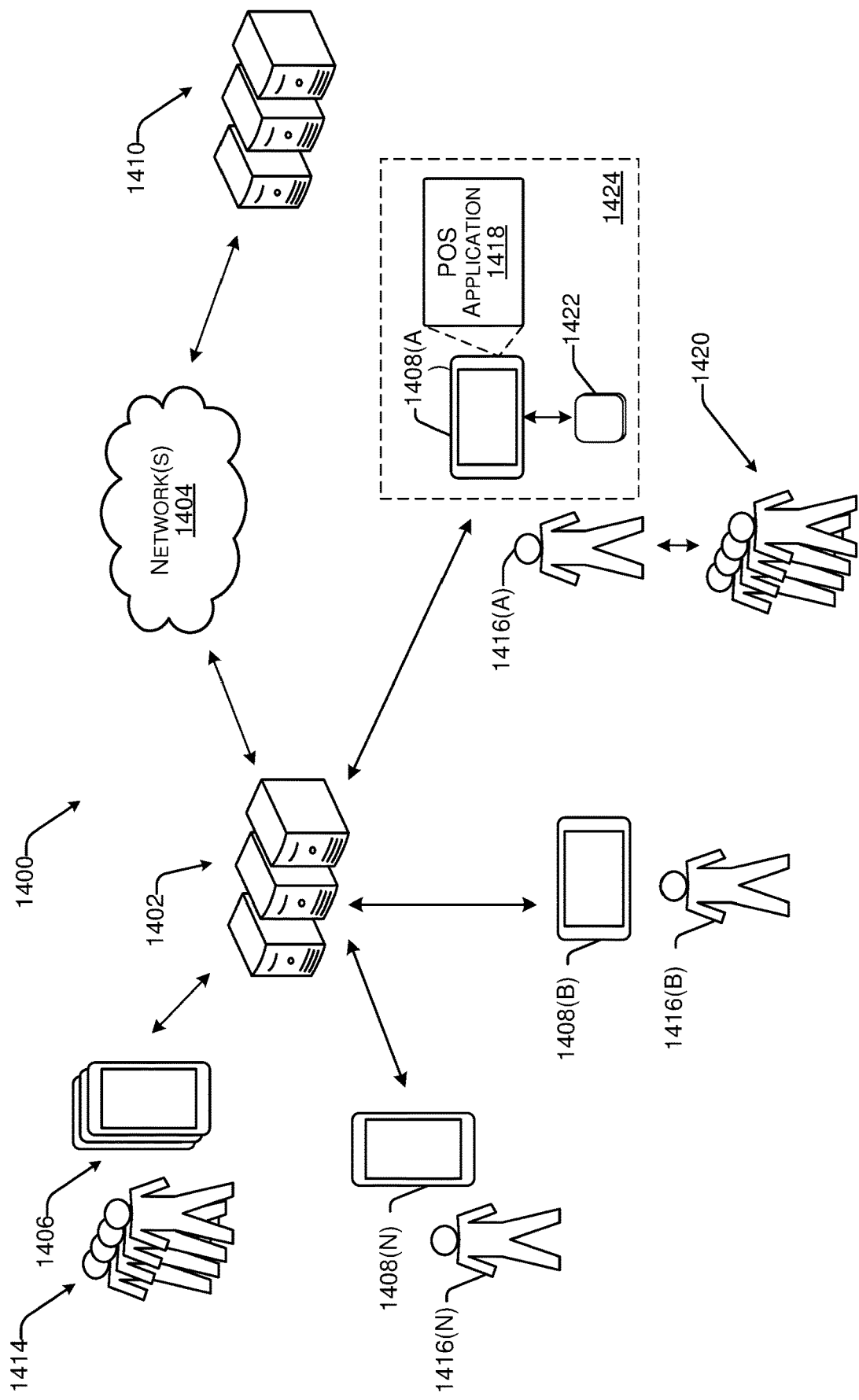
FIG. 14 illustrates an example environment that may employ the techniques presented herein to effectuate monetization of performances, according to an implementation presented herein.

FIG. 14 illustrates an example environment 1400. The environment 1400 includes server(s) 1402 that can communicate over a network 1404 with user devices 1406 (which, in some examples can be merchant devices 1408 (individually, 1408(A)-1408(N))) and/or server(s) 1410 associated with third-party service provider(s). The server(s) 1402 can be associated with a service provider that can provide one or more services for the benefit of users 1414, as described below. Actions attributed to the service provider can be performed by the server(s) 1402.

In some implementations, the servers 1402 are associated with the service provider network 104. Additionally, merchant devices 1408 may also be associated with content creators who create media content items for playback, in some implementations. In these example scenarios, monetization of content created using the described technologies may be distributed, streamed, and/or paid for, and revenue associated with a content creator may be credited (e.g., based on any particular crediting formula, portioning, or other method) to an associated content creator.

The environment 1400 can include a plurality of user devices 1406, as described above. Each one of the plurality of user devices 1406 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1414. The users 1414 can be referred to as customers, buyers, merchants, sellers, borrowers, employees, employers, payors, payees, couriers and so on. The users 1414 can interact with the user devices 1406 via user interfaces presented via the user devices 1406. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1406 can have an instance or versioned instance of an application, which can be downloaded from an application store, for example, which can present the user interface(s) described herein. In at least one example, a user 1414 can interact with the user interface via touch input, spoken input, or any other type of input.

As described above, in at least one example, the users 1414 can include merchants 1416 (individually, 1416(A)-1416(N)). In an example, the merchants 1416 can operate respective merchant devices 1408, which can be user devices 1406 configured for use by merchants 1416. For the purpose of this discussion, a "merchant" can be any entity that offers items (e.g., goods or services) for purchase or other means of acquisition (e.g., rent, borrow, barter, etc.). The merchants 1416 can offer items for purchase or other means of acquisition via brick-and-mortar stores, mobile stores (e.g., pop-up shops, food trucks, etc.), online stores, combinations of the foregoing, and so forth. In some examples, at least some of the merchants 1416 can be associated with a same entity but can have different merchant locations and/or can have franchise/franchisee relationships. In additional or alternative examples, the merchants 1416 can be different merchants. That is, in at least one example, the merchant 1416(A) is a different merchant than the merchant 1416(B) and/or the merchant 1416(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1408 can have an instance of a POS application 1418 stored thereon. The POS application 1418 can configure the merchant device 1408 as a POS terminal, which enables the merchant 1416(A) to interact with one or more customers 1420. As described above, the users 1414 can include customers, such as the customers 1420 shown as interacting with the merchant 1416(A). For the purpose of this discussion, a "customer" can be any entity that acquires items from merchants. While only two customers 1420 are illustrated in FIG. 14, any number of customers 1420 can interact with the merchants 1416. Further, while FIG. 14 illustrates the customers 1420 interacting with the merchant 1416(A), the customers 1420 can interact with any of the merchants 1416.

In at least one example, interactions between the customers 1420 and the merchants 1416 that involve the exchange of funds (from the customers 1420) for items (from the merchants 1416) can be referred to as "transactions." In at least one example, the POS application 1418 can determine transaction data associated with the POS transactions. Transaction data can include payment information, which can be obtained from a reader device 1422 associated with the merchant device 1408(A), user authentication data, purchase amount information, point-of-purchase information (e.g., item(s) purchased, date of purchase, time of purchase, etc.), etc. The POS application 1418 can send transaction data to the server(s) 1402 such that the server(s) 1402 can track transactions of the customers 1420, merchants 1416, and/or any of the users 1414 over time. Furthermore, the POS application 1418 can present a UI to enable the merchant 1416(A) to interact with the POS application 1418 and/or the service provider via the POS application 1418.

In at least one example, the merchant device 1408(A) can be a special-purpose computing device configured as a POS terminal (via the execution of the POS application 1418). In at least one example, the POS terminal may be connected to a reader device 1422, which is capable of accepting a variety of payment instruments, such as credit cards, debit cards, gift cards, short-range communication based payment instruments, and the like, as described below. In at least one example, the reader device 1422 can plug in to a port in the merchant device 1408(A), such as a microphone port, a headphone port, an audio-jack, a data port, or other suitable port. In additional or alternative examples, the reader device 1422 can be coupled to the merchant device 1408(A) via another wired or wireless connection, such as via a Bluetooth®, BLE, and so on. In some examples, the reader device 1422 can read information from alternative payment instruments including, but not limited to, wristbands and the like.

In some examples, the reader device 1422 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1422, and communicate with the server(s) 1402, which can provide, among other services, a payment processing service. The server(s) 1402 associated with the service provider can communicate with server(s) 1410, as described below. In this manner, the POS terminal and reader device 1422 may collectively process transaction(s) between the merchants 1416 and customers 1420. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1422 of the POS system 1424 are shown as separate devices, in additional or alternative examples, the POS terminal and the reader device 1422 can be part of a single device. In some examples, the reader device 1422 can have a display integrated therein for presenting information to the customers 1420. In additional or alternative examples, the POS terminal can have a display integrated therein for presenting information to the customers 1420. POS systems, such as the POS system 1424, may be mobile, such that POS terminals and reader devices may process transactions in disparate locations across the world. POS systems can be used for processing card-present transactions and card-not-present (CNP) transactions, as described below.

A card-present transaction is a transaction where both a customer 1420 and his or her payment instrument are physically present at the time of the transaction. Card-present transactions may be processed by swipes, dips, taps, or any other interaction between a physical payment instrument (e.g., a card), or otherwise present payment instrument, and a reader device 1422 whereby the reader device 1422 is able to obtain payment data from the payment instrument. A swipe is a card-present transaction where a customer 1420 slides a card, or other payment instrument, having a magnetic strip through a reader device 1422 that captures payment data contained in the magnetic strip. A dip is a card-present transaction where a customer 1420 inserts a payment instrument having an embedded microchip (i.e., chip) into a reader device 1422 first. The dipped payment instrument remains in the payment reader until the reader device 1422 prompts the customer 1420 to remove the card, or other payment instrument. While the payment instrument is in the reader device 1422, the microchip can create a one-time code which is sent from the POS system 1424 to the server(s) 1410 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1420 may tap or hover his or her payment instrument (e.g., card, electronic device such as a smart phone running a payment application, etc.) over a reader device 1422 to complete a transaction via short-range communication (e.g., NFC, RFID, Bluetooth®, BLE, etc.). Short-range communication enables the payment instrument to exchange information with the reader device 1422. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1424, the server(s) 1402, and/or the server(s) 1410 may exchange payment information and transaction data to determine whether transactions are authorized. For example, the POS system 1424 may provide encrypted payment data, user authentication data, purchase amount information, point-of-purchase information, etc. (collectively, transaction data) to server(s) 1402 over the network(s) 1404. The server(s) 1402 may send the transaction data to the server(s) 1410. As described above, in at least one example, the server(s) 1410 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1410 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1410 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1410 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1410 associated therewith), and a payment authorization message is communicated from the issuer to the POS device via a path opposite of that described above, or via an alternate path.

As described above, the server(s) 1410, which can be associated with payment service provider(s), may determine whether the transaction is authorized based on the transaction data, as well as information relating to parties to the transaction (e.g., the customer 1420 and/or the merchant 1416(A)). The server(s) 1410 may send an authorization notification over the network(s) 1404 to the server(s) 1402, which may send the authorization notification to the POS system 1424 over the network(s) 1404 to indicate whether the transaction is authorized. The server(s) 1402 may also transmit additional information such as transaction identifiers to the POS system 1424. In one example, the server(s) 1402 may include a merchant application and/or other functional components for communicating with the POS system 1424 and/or the server(s) 1410 to authorize or decline transactions.

Based on the authentication notification that is received by the POS system 1424 from server(s) 1402, the merchant 1416(A) may indicate to the customer 1420 whether the transaction has been approved. In some examples, approval may be indicated at the POS system 1424, for example, at a display of the POS system 1424. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1414 can access all of the services of the service provider. In other examples, the users 1414 can have gradated access to the services, which can be based on risk tolerance, IDV outputs, subscriptions, and so on. In at least one example, access to such services can be availed to the merchants 1416 via the POS application 1418. In additional or alternative examples, each service can be associated with its own access point (e.g., application, web browser, etc.).

The service provider can offer payment processing services for processing payments on behalf of the merchants 1416, as described above. For example, the service provider can provision payment processing software, payment processing hardware and/or payment processing services to merchants 1416, as described above, to enable the merchants 1416 to receive payments from the customers 1420 when conducting POS transactions with the customers 1420. For instance, the service provider can enable the merchants 1416 to receive cash payments, payment card payments, and/or electronic payments from customers 1420 for POS transactions and the service provider can process transactions on behalf of the merchants 1416.

As the service provider processes transactions on behalf of the merchants 1416, the service provider can maintain accounts or balances for the merchants 1416 in one or more ledgers. For example, the service provider can analyze transaction data received for a transaction to determine an amount of funds owed to a merchant 1416(A) for the transaction. In at least one example, such an amount can be a total purchase price less fees charged by the service provider for providing the payment processing services. Based on determining the amount of funds owed to the merchant 1416(A), the service provider can deposit funds into an account of the merchant 1416(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1416(A) to a bank account of the merchant 1416(A) that is held at a bank or other financial institution (e.g., associated with the server(s) 1410). Scheduled deposits can occur at a prearranged time after a POS transaction is funded, which can be a business day after the POS transaction occurred, or sooner or later. In some examples, the merchant 1416(A) can access funds prior to a scheduled deposit. For instance, the merchant 1416(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1416(A) can have a payment instrument that is linked to the stored balance that enables the merchant to access the funds without first transferring the funds from the account managed by the service provider to the bank account of the merchant 1416(A).

In at least one example, the service provider may provide inventory management services. That is, the service provider may provide inventory tracking and reporting. Inventory management services may enable the merchant 1416(A) to access and manage a database storing data associated with a quantity of each item that the merchant 1416(A) has available (i.e., an inventory). Furthermore, in at least one example, the service provider can provide catalog management services to enable the merchant 1416(A) to maintain a catalog, which can be a database storing data associated with items that the merchant 1416(A) has available for acquisition (i.e., catalog management services). In at least one example, the catalog may include a plurality of data items and a data item of the plurality of data items may represent an item that the merchant 1416(A) has available for acquisition. The service provider can offer recommendations related to pricing of the items, placement of items on the catalog, and multi-party fulfillment of the inventory.

In at least one example, the service provider can provide business banking services, which allow the merchant 1416(A) to track deposits (from payment processing and/or other sources of funds) into an account of the merchant 1416(A), payroll payments from the account (e.g., payments to employees of the merchant 1416(A)), payments to other merchants (e.g., business-to-business) directly from the account or from a linked debit card, withdrawals made via scheduled deposit and/or instant deposit, etc. Furthermore, the business banking services can enable the merchant 1416(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1416 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1416. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1412 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1414 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1416. In at least one example, the service provider can recommend and/or generate content items to supplement omni-channel presences of the merchants 1416. That is, if a merchant of the merchants 1416 has a web page, the service provider-via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1414 to set schedules for scheduling appointments and/or users 1414 to schedule appointments.

In some examples, the service provider can provide restaurant management services to enable users 1414 to make and/or manage reservations, to monitor front-of-house and/or back-of-house operations, and so on. In such examples, the merchant device(s) 1408 and/or server(s) 1402 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1414 who can travel between locations to perform services for a requesting user 1414 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1406.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1414, voice inputs into a virtual assistant or the like, to determine intents of user(s) 1414. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1414 may be new to the service provider such that the user 1414 that has not registered (e.g., subscribed to receive access to one or more services offered by the service provider) with the service provider. The service provider can offer onboarding services for registering a potential user 1414 with the service provider. In some examples, onboarding can involve presenting various questions, prompts, and the like to a potential user 1414 to obtain information that can be used to generate a profile for the potential user 1414. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1414 providing all necessary information, the potential user 1414 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1410). That is, the service provider can offer IDV services to verify the identity of users 1414 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1414 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1410 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1402) and/or the server(s) 1410 via the network(s) 1404. In some examples, the merchant device(s) 1408 are not capable of connecting with the service provider (e.g., the server(s) 1402) and/or the server(s) 1410, due to a network connectivity issue, for example. In additional or alternative examples, the server(s) 1402 are not capable of communicating with the server(s) 1410 due to network connectivity issue, for example. In such examples, devices may operate in "offline" mode where at least some payment data is stored (e.g., on the merchant device(s) 1408) and/or the server(s) 1402 until connectivity is restored and the payment data can be transmitted to the server(s) 1402 and/or the server(s) 1410 for processing.

In at least one example, the service provider can be associated with a hub, such as an order hub, an inventory hub, a fulfillment hub and so on, which can enable integration with one or more additional service providers (e.g., associated with the additional server(s) 1410). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1406 that are in communication with server(s) 1402 of the service provider. That is, techniques described herein are directed to a specific implementation—or, a practical application—of utilizing a distributed system of user devices 1406 that are in communication with server(s) 1402 of the service provider to perform a variety of services, as described above. The unconventional configuration of the distributed system described herein enables the server(s) 1402 that are remotely-located from end-users (e.g., users 1414) to intelligently offer services based on aggregated data associated with the end-users, such as the users 1414 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1414 and user devices 1406. Furthermore, such features are changed dynamically based on the profiles of the users involved interacting with the GUIs. As such, techniques described herein are directed to improvements to computing systems.

Figure 15:
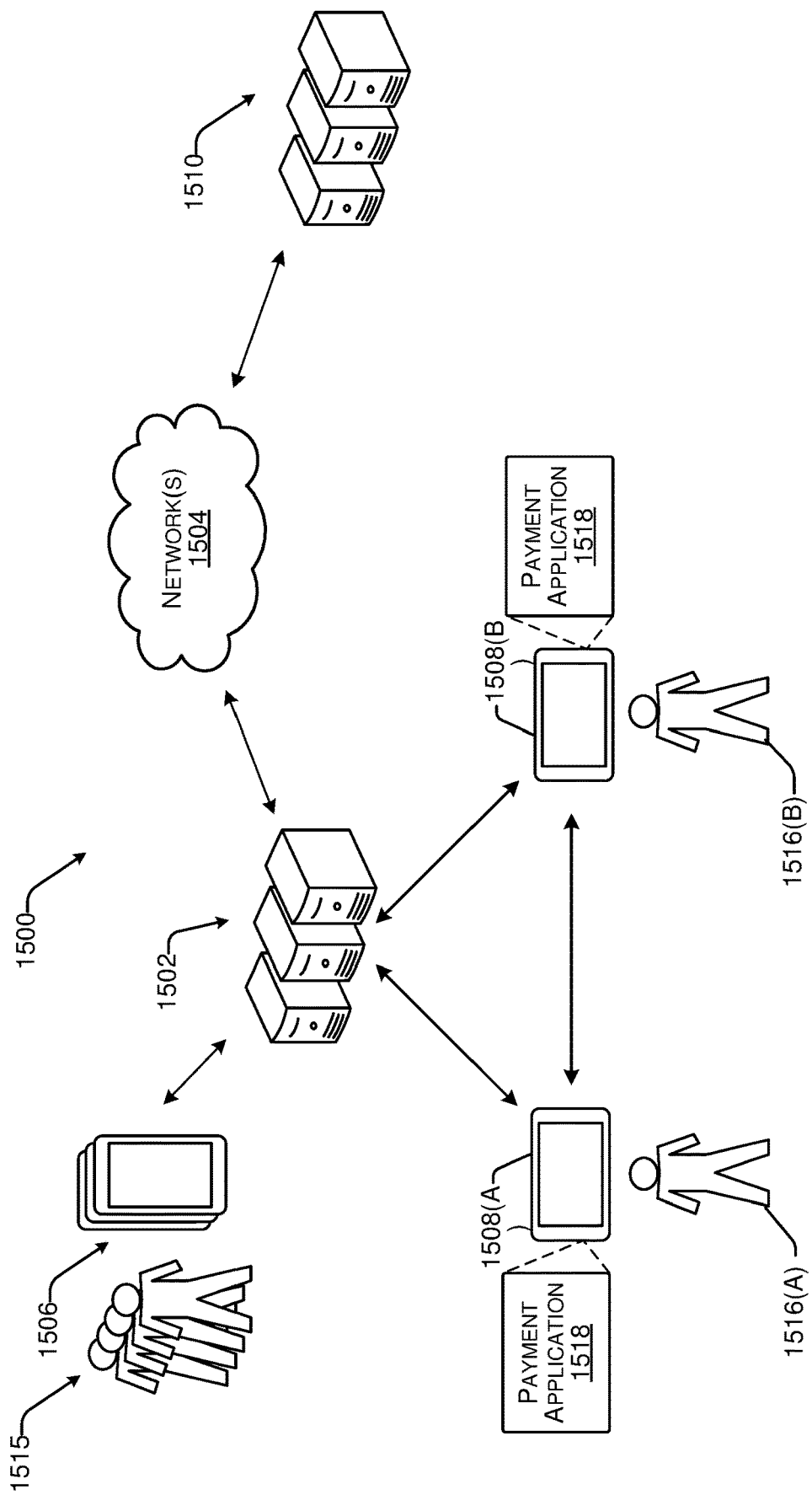
FIG. 15 illustrates an example environment that may employ the techniques presented herein to effectuate monetization of performances, according to an implementation presented herein.

FIG. 15 illustrates an example environment 1500. The environment 1500 includes server(s) 1502 that can communicate over a network 1504 with user devices 1506 (which, in some examples can be user devices 1508 (individually, 1508(A), 1508(B)) and/or server(s) 1510 associated with third-party service provider(s). The server(s) 1502 can be associated with a service provider that can provide one or more services for the benefit of users 1515, as described below. Actions attributed to the service provider can be performed by the server(s) 1502. In some examples, the service provider referenced in FIG. 14 can be the same or different than the service provider referenced in FIG. 15.

In some implementations, the servers 1502 are associated with the service provider network 104. Additionally, devices 1506 may also be associated with content creators and devices 1508 may be associated with content creators or other users, in some implementations. In these example scenarios, monetization of content created using the described technologies may be distributed, streamed, and/or paid for, and revenue associated with a content creator may be credited (e.g., based on any particular crediting formula, portioning, or other method) to an associated content creator.

The environment 1500 can include a plurality of user devices 1506, as described above. Each one of the plurality of user devices 1506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1515. The users 1515 can be referred to as customers, buyers, merchants, sellers, borrowers, employees, employers, payors, payees, couriers and so on. The users 1515 can interact with the user devices 1506 via user interfaces presented via the user devices 1506. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1506 can have an instance or versioned instance of an application, which can be downloaded from an application store, for example, which can present the user interface(s) described herein. In at least one example, a user 1515 can interact with the user interface via touch input, spoken input, or any other type of input.

In at least one example, the service provider can provide a peer-to-peer payment service that enables peer-to-peer payments between two or more users 1515. Two users, user 1516(A) and user 1516(B) are illustrated in FIG. 15 as "peers" in a peer-to-peer payment. In at least one example, the service provider can communicate with instances of a payment application 1518 (or other access point) installed on devices 1506 configured for operation by users 1515. In an example, an instance of the payment application 1518 executing on a first device 1508(A) operated by a payor (e.g., user 1516(A)) can send a request to the service provider to transfer an asset (e.g., fiat currency, non-fiat currency, digital assets, cryptocurrency, securities, gift cards, and/or related assets) from the payor to a payee (e.g., user 1516(B)) via a peer-to-peer payment. In some examples, assets associated with an account of the payor are transferred to an account of the payee. In some examples, assets can be held at least temporarily in an account of the service provider prior to transferring the assets to the account of the payee.

In some examples, the service provider can utilize a ledger system to track transfers of assets between users 1515. The ledger system can enable users 1515 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1518 executing on user device(s) of payee(s). As an example, the service provider can transfer assets from an account of user 1516(A) to an account of the user 1516(B) and can send a notification to the user device 1508(B) of the user 1516(B) for presentation via a user interface. The notification can indicate that a transfer is in process, a transfer is complete, or the like. In some examples, the service provider can send additional or alternative information to the instances of the payment application 1518 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., 15Cash). The currency indicator operates as the tagging mechanism that indicates to the server(s) 1502 to treat the inputs as a request from the payor to transfer assets, where detection of the syntax triggers a transfer of assets. The currency indicator can correspond to various currencies including but not limited to, dollar (15), euro (€), pound (£), rupee (₹), yuan (¥), etc. Although use of the dollar currency indicator (15) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1518 executing on the user devices 1506. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/15Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 15 or a third-party service provider associated with the server(s) 1510. In examples where the content provider is a third-party service provider, the server(s) 1510 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 15. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1506 (e.g., mobile device or conventional personal computer (PC)) based on instructions transmitted to and from the server(s) 1502 (which, in such an example can be called a "messaging server"). In some instances, the messaging application can include a payment application with messaging capability that enables users of the payment application to communicate with one another. In such instances, the payment application can be executed on a user device 1506 based on instructions transmitted to and from the server(s) 1502 (e.g., the payment service discussed in this description or another payment service that supports payment transactions). In some examples, the messaging application can be provided by a third-party service provider associated with the server(s) 1510. In examples where the messaging application is a third-party service provider, the server(s) 1510 can be accessible via one or more APIs or other integrations.

As described above, the service provider can facilitate peer-to-peer transactions, which can enable users 1515 to transfer fiat currency, non-fiat currency, cryptocurrency, securities, or other assets, or portions thereof, to other users 1515. In at least one example, individual users can be associated with user accounts. Additional details associated with user accounts and the transfer of assets between users 1515 are described below with reference to FIG. &.

Furthermore, the service provider of FIG. 15 can enable users 1515 to perform banking transactions via instances of the payment application 1518. For example, users can configure direct deposits or other deposits for adding assets to their various ledgers/balances. Further, users 1515 can configure bill pay, recurring payments, and/or the like using assets associated with their accounts. In addition to sending and/or receiving assets via peer-to-peer transactions, users 1515 buy and/or sell assets via asset networks such as cryptocurrency networks, securities networks, and/or the like.

Figure 16:
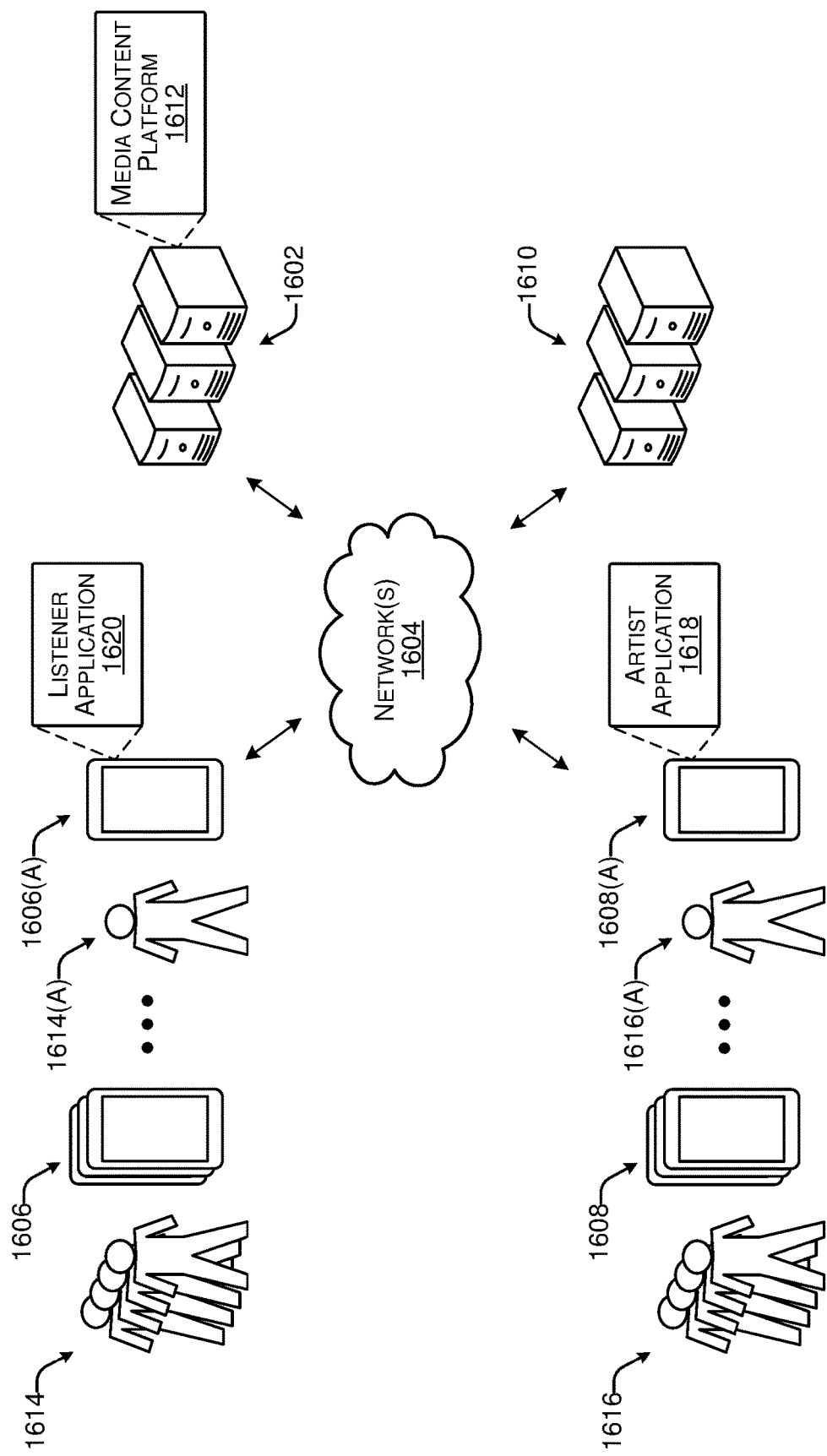
FIG. 16 illustrates an example environment that may employ the techniques presented herein, according to an implementation presented herein.

FIG. 16 illustrates an example environment 1600. The environment 1600 includes server(s) 1602 that can communicate over a network 1604 with user devices 1606 (an individual instance of which is shown as user device 1606(A)), as well as user devices 1608 (an individual instance of which is shown as user device 1608(A)) and/or server(s) 1610 associated with third-party service provider(s). The server(s) 1602 can be associated with a service provider that can provide one or more services for the benefit of users 1614 and/or users 1616, as described below. Actions attributed to the service provider can be performed by the server(s) 1602. In some examples, the service provider referenced in FIGS. 14 and 15 can be the same or different than the service provider referenced in FIG. 16.

In some implementations, the servers 1602 are associated with the service provider network 104. Additionally, user devices 1606 and/or 1608 may also be associated with content creators or listener users, in some implementations. In these example scenarios, monetization of content created using the described technologies may be distributed, streamed, and/or paid for, and revenue associated with a content creator may be credited (e.g., based on any particular crediting formula, portioning, or other method) to an associated content creator.

The environment 1600 can include a plurality of user devices 1606 and/or user devices 1608, as described above. Each one of the plurality of user devices 1606 and/or 1608 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, an audio output device (e.g., a speaker), etc. In some examples, individual ones of the user devices can be operable by users 1614 and/or the users 1616. The users 1614 and/or the users 1616 can be referred to as customers, buyers, merchants, sellers, borrowers, employees, employers, payors, payees, couriers, artists, musicians, listeners, supervisors, hosts, audience members, and so on. The users 1614 can interact with the user devices 1606 via user interfaces presented via the user devices 1606. Similarly, the users 1616 can interact with the user devices 1608 via user interfaces presented via the user devices 1608. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1606 can have an instance or versioned instance of an application, which can be downloaded from an application store, for example, which can present the user interface(s) described herein. In at least one example, a user 1614(A) and/or a user 1616(A) can interact with the user interface via touch input, spoken input, or any other type of input.

In at least one example, the service provider can play digital media where playback may occur using "streaming" where the media is transmitted over the network to the media player or a media application executing on a device (e.g., speaker), which decodes and plays the media while data is being received. The media may be played using characteristics, e.g., of the network, indicated via bit rate to account for variable latency and bandwidth within the communications network. In some cases, a buffer queues some of the audio/video data ahead of the media actually being played. During moments of network congestion, which leads to lower available bandwidth, less audio/video data is added to the buffer, which drains down as media is being de-queued during streaming playback. However, during moments of high network bandwidth, the buffer is replenished, adding data to the buffer.

In at least one example, the service provider can provide a digital media streaming service (e.g., subscription-based, non-subscription-based) that enables the user devices 1606 to stream and/or download digital media via a listener application 1620 installed on the individual user devices 1606. For instance, the digital media streaming service may be a digital audio streaming service (e.g., for music, podcasts, audiobooks, etc.), a digital video streaming service, and/or a streaming service that provides streaming of various different types of digital media or multimedia. In examples, the digital media streaming service may enable the users 1614 to stream digital media items (e.g., songs, podcasts, videos, audiobooks, etc.) on-demand from a centralized library provided by the digital media streaming service via the listener application 1620 on the user devices 1606, and/or from a variety of different decentralized sources. Alternatively or additionally, the digital media streaming service may provide functionality to the users 1614 to download digital media items (e.g., songs, podcasts, videos, audiobooks, etc.) from the centralized library or decentralized sources to be stored locally on the user devices 1606 and subsequently accessed using the listener application 1620. In such cases where digital media items are downloaded and stored locally on the user devices 1606, the listener application 1620 may verify access rights to the digital media items at time intervals, for instance intermittently (e.g., when the user device 1606 has a network connection with the media content platform 1612 via the network(s) 1604), and/or at regular intervals (e.g., daily, weekly, monthly, etc.). In examples, access rights to the digital media items may be provided when a subscription to the digital media streaming service is active, while access rights to the digital media items may be withheld when the subscription to the digital media streaming service is terminated. Enabling storage on the user devices 1606 and subsequent access to digital media items via the listener application 1620 provides the users 1606 with the ability to access the digital media items "offline" such as when a connection to the digital media streaming service via the network(s) 1604 is unavailable or unreliable.

In some examples, the service provider may additionally or alternatively provide an artist management service that enables the users 1616 to manage aspects of artist business via an artist application 1618 installed on the user devices 1608, such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some examples, the users 1616 can access all of the services of the artist management service. In other examples, the users 1616 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1616 may have access to a single user account via respective user devices 1606, with the various users 1616 having different access privileges to services provided by the artist management service. In a non-limiting example, an artist may have access to all of the service of the artist management service; a personal manager may have access to marketing, cash flow management, publishing, CRM, social media, event coordination, and industry communications; a business manager may have access to regulatory obligations and cash flow management; and an attorney may have access to regulatory obligations, cash flow management, publishing, event coordination, and industry communications. Accordingly, an artist can designate functions provided by the artist management service to different members of the team associated with the artist, thus granting the respective team members access to services suited to the skills of the individual team members.

In some cases, the artist application 1618 and the listener application 1620 may be distinct applications having differing user experiences and verification processes for access, such as illustrated in the environment 1600. For instance, the service provider may request additional verification, such as a link to an artist website, a sample of an artist's work, a verified credential supplied by a third party, etc. to grant access to the artist application 1618 in addition to information requested to access the listener application 1620. Further, the artist application 1618 may provide the artist management services described herein, without the subscription-based digital media streaming services described herein, and vice versa. However, examples are also considered in which functionality provided by the artist application 1618 and the listener application 1620 partially or fully overlap, and/or where verification processes for access are substantially similar.

In at least some examples, the service provider enables interaction between the users 1614 utilizing the listener application 1620 installed on the user devices 1606, and the users 1616 utilizing the artist application 1618 installed on the user devices 1608. For example, the service provider may provide the subscription-based digital media streaming service features described above, the artist management service features described above, as well as interconnectivity between the subscription-based digital media streaming service and the artist management service. Functionality provided by the service provider in such instances may include a communication channel between one or more of the users 1614 (e.g., a listener, fan, music supervisor, publisher, etc.) utilizing the listener application 1620 and a particular user 1616(A) (e.g., an artist) utilizing the artist application 1618. Examples are also considered in which the service provider provides a communication channel between one or more of the users 1616 (e.g., an artist) utilizing the artist application 1618 and a particular user 1614(A) (e.g., a listener, fan, music supervisor, publisher, etc.) utilizing the listener application 1620. The communication channel may include, for instance, a messaging platform (also referred to as a "messaging application" herein), a live streaming platform, a videoconferencing or teleconferencing platform, or a combination of these.

Additionally, in some cases, the service provider may facilitate a resource transfer between the listener application 1620 and the artist application 1618. In an example, the service provider may direct a resource, such as a portion of a subscription fee paid by the user 1614(A), to one or more of the users 1616 based on a number of instances that the user 1614(A) consumed (e.g., streamed, downloaded, etc.) content created by respective ones of the users 1616. Alternatively or additionally, the service provider may direct a resource, such as funds, from an account associated with the user 1614(A) to an account associated with the user 1616(A) (or vice versa), in accordance with transfers between accounts as described herein. The service provider may facilitate resource transfers in examples such as merchandise purchases, event ticket purchases, "tipping" an artist, payments for royalties or other fees, and so forth.

In some examples, the service provider enables interaction between individual ones of the users 1614 with one another via the listener application 1620 installed on the user devices 1606. Similar to the discussion above, the service provider may provide a communication channel between individual ones of the users 1614 via respective listener applications 1620 installed on the user devices 1606. The communication channel may include, for instance, a messaging platform (also referred to as a "messaging application" herein), a live streaming platform, a videoconferencing or teleconferencing platform, or a combination of these. In an example, the listener application 1620 may provide functionality via a communication channel for a user 1614(A) to stream an individual digital media item, a playlist, or the like to an audience comprising other ones of the user devices 1606. Alternatively or additionally, the communication channel may facilitate sharing of individual digital media items, playlists, user and/or artist profiles, and the like between the users 1614 via messages, uniform resource locators (URLs), quick response (QR) codes, and so forth.

In some cases, the service provider enables interaction between individual ones of the users 1616 with one another via the artist application 1618 installed on the user devices 1608. In examples, the service provider may provide a communication channel between individual ones of the users 1616 via respective artist applications 1618 installed on the user devices 1608. In some instances, the service provider may provide recommendations for a particular user 1616(A) indicating which of the other users 1616 to communicate with. Such a recommendation may be based on a similarity (or dissimilarity) of content created by two or more of the users 1616, an overlap (or lack thereof) of audience members of the users 1616, a geographic location of the users 1616, a coinciding event location of the users 1616, and so forth. In some examples, the user 1616(A) may input parameters for a desired connection via the artist application 1618, and the service provider may filter which of the users 1616 to surface for recommendations to the user 1616(A) based on the input parameters. Alternatively or additionally, the service provider may implement one or more machine learning models to filter which of the users 1616 to surface for recommendations to the user 1616(A). The recommendations provided by the service provider may be data driven and thus increase relevance of communications presented to the users 1616 and reduce unsolicited communications that may be received by the users 1616.

Whether or not a user 1616(A) utilizes a recommendation provided by the service provider to conduct communication via the communication channel with other ones of the users 1616, the communication channel may include various functionality for individual ones of the users 1616 to communicate with one another. For example, the communication channel may include a messaging platform (also referred to as a "messaging application" herein), a live streaming platform, a videoconferencing or teleconferencing platform, or a combination of these. In an example, the artist application 1618 may provide functionality via a communication channel for a user 1616(A) to stream an individual digital media item, a playlist, or the like to an audience comprising the user devices 1606 having a listener application 1620 installed thereon. Alternatively or additionally, the communication channel may facilitate sharing of individual digital media items, playlists, an artist profile associated with the user 1616(A) (or a different one of the users 1616), and the like with the users 1614 via messages, uniform resource locators (URLs), quick response (QR) codes, and so forth.

The media content platform 1612 may interact with the server(s) 1610 associated with the third-party service providers to, for instance, ingest digital media items, report digital media consumption data, pay royalties, and the like. In some examples, the server(s) 1610 may be accessible by the service provider via one or more APIs or other integrations. In some cases, the third-party service provider may be a digital media content provider (e.g., a record label, a performance rights organization (PRO), an independent artist, etc.). In such cases, the service provider may receive digital media items from the server(s) 1610, along with metadata associated with the digital media items. The metadata, in some instances, may indicate individual contributors to a digital media item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The service provider may use the metadata to associate the digital media item as being created by a particular user 1616(A), to provide search results to the users 1614, to generate playlists, and so forth. Further, the service provider may provide payments (e.g., royalties) to the third-party service provider based on a number of streams and/or downloads of individual digital media items to the users 1614 via the listener application 1620.

Figure 17:
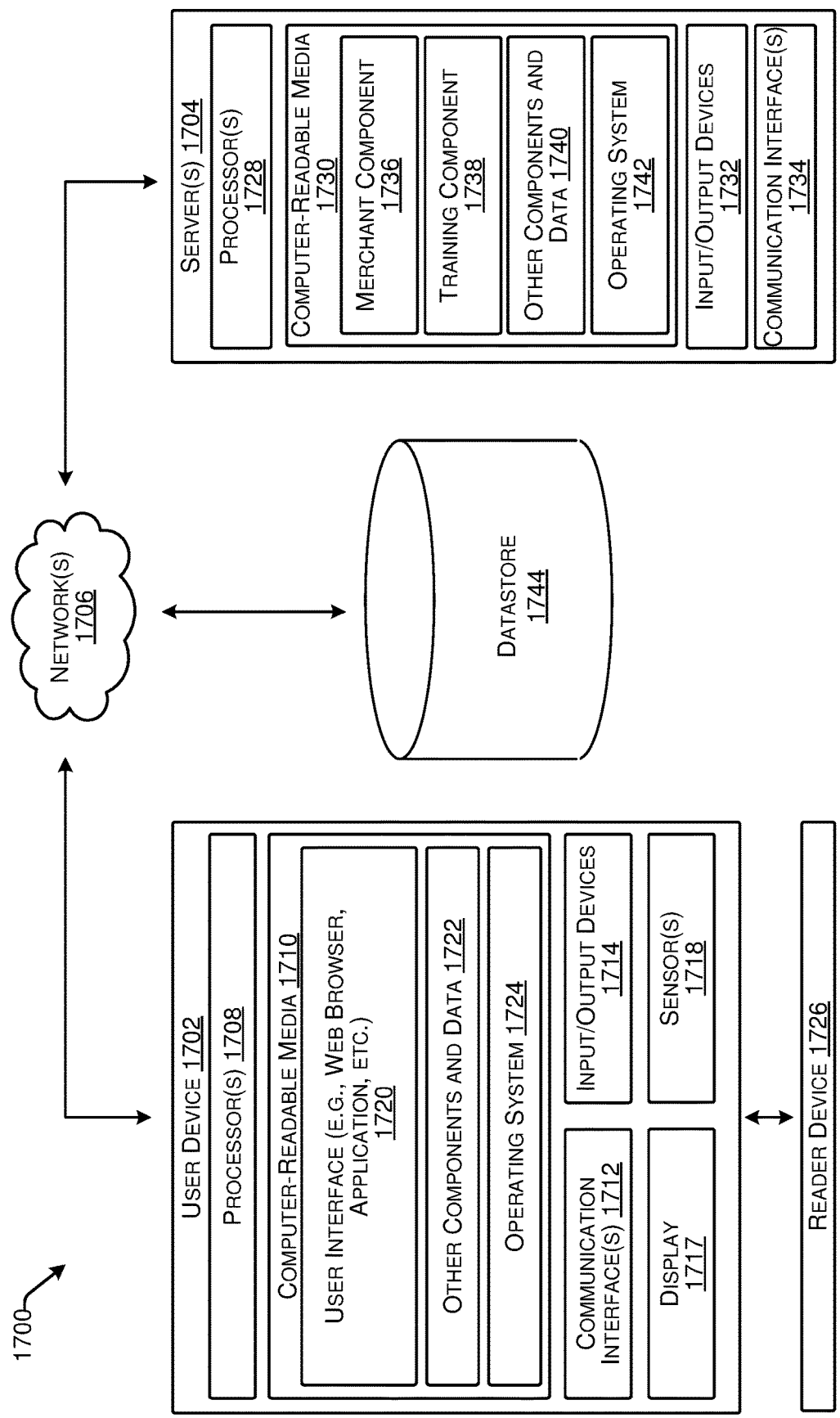
FIG. 17 illustrates a system that may employ the techniques presented herein, according to an implementation presented herein.

FIG. 17 depicts an illustrative block diagram illustrating a system 1700 for performing techniques described herein. The system 1700 includes a user device 1702, that communicates with server computing device(s) (e.g., server(s) 1704) via network(s) 1706 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1702 is illustrated, in additional or alternate examples, the system 1700 can have multiple user devices, as described above with reference to FIG. 14 and FIG. 15.

In some implementations, the servers 1702 are associated with the service provider network 104. Additionally, user device 1702 and user interface 1720 may also be associated with content creators or listener users, in some implementations. In these example scenarios, the user interface 1720 may function at least somewhat similar to one or more of the user interfaces 700, 800, 802, 900, 902, 1000, 1002, 1100, 1102, and/or 1200.

In at least one example, the user device 1702 can be any suitable type of computing device, e.g., portable, semi-portable, semi-stationary, or stationary. Some examples of the user device 1702 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1702 can be any computing device capable of sending communications and performing the functions according to the techniques described herein. The user device 1702 can include devices, e.g., payment card readers, or components capable of accepting payments, as described below.

In the illustrated example, the user device 1702 includes one or more processors 1708, one or more computer-readable media 1710, one or more communication interface(s) 1712, one or more input/output (I/O) devices 1714, a display 1717, and sensor(s) 1718.

In at least one example, each processor 1708 can itself comprise one or more processors or processing cores. For example, the processor(s) 1708 can be implemented as one or more microprocessors, microcomputers, microcontrollers, digital signal processors, central processing units, state machines, logic circuitries, and/or any devices that manipulate signals based on operational instructions. In some examples, the processor(s) 1708 can be one or more hardware processors and/or logic circuits of any suitable type specifically programmed or configured to execute the algorithms and processes described herein. The processor(s) 1708 can be configured to fetch and execute computer-readable processor-executable instructions stored in the computer-readable media 1710.

Depending on the configuration of the user device 1702, the computer-readable media 1710 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1710 can include, but is not limited to, RAM, ROM, EEPROM, flash memory, solid-state storage, magnetic disk storage, optical storage, and/or other computer-readable media technology. Further, in some examples, the user device 1702 can access external storage, such as RAID storage systems, storage arrays, network attached storage, storage area networks, cloud storage, or any other medium that can be used to store information and that can be accessed by the processor(s) 1708 directly or through another computing device or network. Accordingly, the computer-readable media 1710 can be computer storage media able to store instructions, components or components that can be executed by the processor(s) 1708. Further, when mentioned, non-transitory computer-readable media exclude media such as energy, carrier signals, electromagnetic waves, and signals per se.

The computer-readable media 1710 can be used to store and maintain any number of functional components that are executable by the processor(s) 1708. In some implementations, these functional components comprise instructions or programs that are executable by the processor(s) 1708 and that, when executed, implement operational logic for performing the actions and services attributed above to the user device 1702. Functional components stored in the computer-readable media 1710 can include a user interface 1720 to enable users to interact with the user device 1702, and thus the server(s) 1704 and/or other networked devices. In at least one example, the user interface 1720 can be presented via a web browser, or the like. In other examples, the user interface 1720 can be presented via an application, such as a mobile application or desktop application, which can be provided by a service provider associated with the server(s) 1704, or which can be an otherwise dedicated application. In some examples, the user interface 1720 can be similar to one or more of the user interfaces 700, 800, 802, 900, 902, 1000, 1002, 1100, 1102, and/or 1200. In at least one example, a user can interact with the user interface via touch input, spoken input, gesture, or any other type of input. The word "input" is also used to describe "contextual" input that may not be directly provided by the user via the user interface 1720. For example, user's interactions with the user interface 1720 are analyzed using, e.g., natural language processing techniques, to determine context or intent of the user, which may be treated in a manner similar to "direct" user input.

Depending on the type of the user device 1702, the computer-readable media 1710 can also optionally include other functional components and data, such as other components and data 1722, which can include programs, drivers, etc., and the data used or generated by the functional components. In addition, the computer-readable media 1710 can also store data, data structures and the like, that are used by the functional components. Further, the user device 1702 can include many other logical, programmatic, and physical components, of which those described are merely examples that are related to the discussion herein.

In at least one example, the computer-readable media 1710 can include additional functional components, such as an operating system 1724 for controlling and managing various functions of the user device 1702 and for enabling basic user interactions.

The communication interface(s) 1712 can include one or more interfaces and hardware components for enabling communication with various other devices, such as over the network(s) 1706 or directly. For example, communication interface(s) 1712 can enable communication through one or more network(s) 1706, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1706 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1702 can further include one or more input/output (I/O) devices 1714. The I/O devices 1714 can include speakers, a microphone, a camera, and various user controls (e.g., buttons, a joystick, a keyboard, a keypad, etc.), a haptic output device, and so forth. The I/O devices 1714 can also include attachments that leverage the accessories (audio-jack, USB-C, Bluetooth, etc.) to connect with the user device 1702.

In at least one example, user device 1702 can include a display 1717. Depending on the type of computing device(s) used as the user device 1702, the display 1717 can employ any suitable display technology. For example, the display 1717 can be a liquid crystal display, a plasma display, a light emitting diode display, an OLED (organic light-emitting diode) display, an electronic paper display, or any other suitable type of display able to present digital content thereon. In at least one example, the display 1717 can be an augmented reality display, a virtually reality display, or any other display able to present and/or project digital content. In some examples, the display 1717 can have a touch sensor associated with the display 1717 to provide a touchscreen display configured to receive touch inputs for enabling interaction with a graphic interface presented on the display 1717. Accordingly, implementations herein are not limited to any particular display technology. Alternatively, in some examples, the user device 1702 may not include the display 1717, and information can be presented by other means, such as aurally, haptically, etc.

In addition, the user device 1702 can include sensor(s) 1718. The sensor(s) 1718 can include a GPS device able to indicate location information. Further, the sensor(s) 1718 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 1702 can include various other components that are not shown, examples of which include removable storage, a power source, such as a battery and power control unit, a barcode scanner, a printer, a cash drawer, and so forth.

In addition, in some examples, the user device 1702 can include, be connectable to, or otherwise be coupled to a reader device 1726, for reading payment instruments and/or identifiers associated with payment objects. In some examples, as described above, the reader device 1726 can plug in to a port in the user device 1702, such as a microphone port, a headphone port, an audio-jack, a data port, or other suitable port. In additional or alternative examples, the reader device 1726 can be coupled to the user device 1702 via another wired or wireless connection, such as via a Bluetooth®, BLE, and so on. The reader device 1726 can include a read head for reading a magnetic strip of a payment card, and further can include encryption technology for encrypting the information read from the magnetic strip. Additionally or alternatively, the reader device 1726 can be an EMV payment reader, which in some examples, can be embedded in the user device 1702. Moreover, numerous other types of readers can be employed with the user device 1702 herein, depending on the type and configuration of the user device 1702.

The reader device 1726 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1726 may include hardware implementation, such as slots, magnetic tracks, and rails with one or more sensors or electrical contacts to facilitate detection and acceptance of a payment instrument. That is, the reader device 1726 may include hardware implementations to enable the reader device 1726 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1726 may also include a biometric sensor to receive and process biometric characteristics and process them as payment instruments, given that such biometric characteristics are registered with the payment service and connected to a financial account with a bank server.

The reader device 1726 may include processing unit(s), computer-readable media, a reader chip, a transaction chip, a timer, a clock, a network interface, a power supply, and so on. The processing unit(s) of the reader device 1726 may execute one or more components and/or processes to cause the reader device 1726 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1726, the computer-readable media may include volatile memory (such as RAM), non-volatile memory (such as ROM, flash memory, miniature hard drive, memory card, or the like), or some combination thereof. In at least one example, the computer-readable media of the reader device 1726 may include at least one component for performing various functions as described herein.

The reader chip may perform functionalities to control the operations and processing of the reader device 1726. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1706, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1726. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1702, which can be a POS terminal, and the reader device 1726 are shown as separate devices, in additional or alternative examples, the user device 1702 and the reader device 1726 can be part of a single device, which may be a battery-operated device. In such an example, components of both the user device 1702 and the reader device 1726 may be associated with the single device. In some examples, the reader device 1726 can have a display integrated therewith, which can be in addition to (or as an alternative of) the display 1717 associated with the user device 1702.

The server(s) 1704 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1704 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1704 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1704 can include one or more processors 1728, one or more computer-readable media 1730, one or more I/O devices 1732, and one or more communication interfaces 1734. Each processor 1728 can be a single processing unit or a number of processing units, and can include single or multiple computing units or multiple processing cores. The processor(s) 1728 can be implemented as one or more microprocessors, microcomputers, microcontrollers, digital signal processors, central processing units, state machines, logic circuitries, and/or any devices that manipulate signals based on operational instructions. For example, the processor(s) 1728 can be one or more hardware processors and/or logic circuits of any suitable type specifically programmed or configured to execute the algorithms and processes described herein. The processor(s) 1728 can be configured to fetch and execute computer-readable instructions stored in the computer-readable media 1730, which can program the processor(s) 1728 to perform the functions described herein.

The computer-readable media 1730 can include volatile and nonvolatile memory and/or removable and non-removable media implemented in any type of technology for storage of information, such as computer-readable instructions, data structures, program components, or other data. Such computer-readable media 1730 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1704, the computer-readable media 1730 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1730 can be used to store any number of functional components that are executable by the processor(s) 1728. In many implementations, these functional components comprise instructions or programs that are executable by the processors 1728 and that, when executed, specifically configure the one or more processors 1728 to perform the actions attributed above to the service provider and/or payment processing service. Functional components stored in the computer-readable media 1730 can optionally include a merchant component 1736, a training component 1738, and one or more other components and data 1740.

The merchant component 1736 can be configured to receive transaction data from POS systems, such as the POS system 624 described above with reference to FIG. 6. The merchant component 1736 can transmit requests (e.g., authorization, capture, settlement, etc.) to payment service server computing device(s) to facilitate POS transactions between merchants and customers. The merchant component 1736 can communicate the successes or failures of the POS transactions to the POS systems.

The training component 1738 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1702 and/or the server(s) 1704 for use at a time after the data models have been trained (e.g., at runtime).

The one or more other components and data 1740 can include one or more of the media service 140, recommendation service 142, and others, the functionality of which is described, at least partially, above. Further, the one or more other components and data 1740 can include programs, drivers, etc., and the data used or generated by the functional components. Further, the server(s) 1704 can include many other logical, programmatic, and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1730 can additionally include an operating system 1742 for controlling and managing various functions of the server(s) 1704.

The communication interface(s) 1734 can include one or more interfaces and hardware components for enabling communication with various other devices, such as over the network(s) 1706 or directly. For example, communication interface(s) 1734 can enable communication through one or more network(s) 1706, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1706 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1704 can further be equipped with various I/O devices 1732. Such I/O devices 1732 can include a display, various user interface controls (e.g., buttons, joystick, keyboard, mouse, touch screen, biometric or sensory input devices, etc.), audio speakers, connection ports and so forth.

In at least one example, the system 1700 can include a datastore 1744 that can be configured to store data that is accessible, manageable, and updatable. In some examples, the datastore 1744 can be integrated with the user device 1702 and/or the server(s) 1704. In other examples, as shown in FIG. 17, the datastore 1744 can be located remotely from the server(s) 1704 and can be accessible to the server(s) 1704. The datastore 1744 can comprise multiple databases and/or servers connected locally and/or remotely via the network(s) 1706.

In at least one example, the datastore 1744 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1744 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1744 can store additional or alternative types of data as described herein.

EXAMPLE CLAUSES

Clause 1. A computer-implemented method, comprising: receiving a request to initialize a media application, the request including data identifying a user account associated with a user device; generating a first playlist and a second playlist for the user account, wherein at least one of the first playlist and the second playlist are generated based on media content playback history associated with the user account; generating a user interface comprising a representation of a media content item on the first playlist; providing the user interface and the media content item to the user device; receiving an indication of a single gesture input from the user device to transition from the media content item on the first playlist, wherein the single gesture input comprises a direction of gesture; providing another media content item to the user device from the second playlist based on the direction of gesture; causing the user device to display another representation of the another media content item in the user interface and to playback the another media content item.

Clause 2. The computer-implemented method according to any preceding clause, wherein the direction of gesture further indicates a selection of playback of a different media content item from the first playlist.

Clause 3. The computer-implemented method according to any preceding clause, wherein the direction of gesture further indicates a selection of a different representation of the media content item for display in the user interface.

Clause 4. The computer-implemented method according to any preceding clause, wherein the single gesture input is a first single gesture input, wherein the media content item is a first media content item, the method further comprising: receiving an indication of a second single gesture input from the user device to transition from the another media content item on the second playlist, wherein the second single gesture input comprises a different direction of gesture; providing the first media content item to the user device from the first playlist responsive to the second single gesture input; and, causing the user device to display the representation of the first media content item in the user interface and to resume playback of the media content item at a time of receipt of the first single gesture input.

Clause 5. The computer-implemented method according to any preceding clause, wherein the representation of the media content item comprises dynamic information based on the media content playback history associated with the user account.

Clause 6. The computer-implemented method according to any preceding clause, wherein the dynamic information comprises one or more of: lyrics, associated album reviews, artist biographies, media content item production credits, media content item producer data, media content item label data, or charting history.

Clause 7. A computer-implemented method, comprising: receiving a request to open a media application on a user device, the request including data identifying a user account associated with the user device; generating a first playlist comprising a first media content item and a second playlist comprising a second media content item; providing the first media content items and a user interface comprising a representation of the first media content item to the user device; receiving an indication of a single gesture input from the user device to transition from the first media content item; and causing the user device to display another representation of the second media content item in the user interface and to playback the second media content item in response to the indication of the single gesture input.

Clause 8. The computer-implemented method according to any preceding clause, wherein the single gesture input comprises a direction of gesture and a force of gesture.

Clause 9. The computer-implemented method according to any preceding clause, wherein the direction of gesture indicates a selection of one or more of: a new playlist different from a current playlist; a new song from the current playlist; or additional information associated with a currently played media content item for display.

Clause 10. The computer-implemented method according to any preceding clause, wherein the force of gesture indicates a degree of change between the first media content item and the second media content item, the degree of change including a number of playlists or media content items to skip over.

Clause 11. The computer-implemented method according to any preceding clause, wherein the single gesture input comprises a single swipe against a screen of the user device, the single swipe having a direction that represents one of at least two orthogonal directions to navigate a data storage element storing the first playlist and the second playlist, and wherein the first playlist and the second playlist comprise a plurality of additional media content items.

Clause 12. The computer-implemented method according to any preceding clause, wherein an x-axis of the data storage element organizes a plurality of media content items associated with a playlist into columns, and wherein a y-axis of the data storage element organizes a plurality of playlists into rows, wherein the single gesture input comprises a direction of gesture, and wherein the direction of gesture coincides with either the x-axis of the data storage element or the y-axis of the data storage element.

Clause 13. The computer-implemented method according to any preceding clause, wherein the single gesture input further comprises a force of gesture, and wherein the force of gesture indicates a number of rows or columns to skip over.

Clause 14. The computer-implemented method according to any preceding clause, wherein the data storage element further comprises a z-axis that organizes a plurality of data related to an associated media content item of a particular row and column.

Clause 15. The computer-implemented method according to any preceding clause, wherein a direction of navigation of the data storage element away from an origin point denotes context of the associated media content items and the user account.

Clause 16. The computer-implemented method according to any preceding clause, wherein the single gesture input is a first single gesture input, the method further comprising: receiving an indication of a second single gesture input from the user device; and causing the user device to transition from audio playback to video playback of the second media content item responsive to the second single gesture input.

Clause 17. The computer-implemented method according to any preceding clause, wherein the single gesture input is a first single gesture input, the method further comprising: receiving an indication of a second single gesture input from the user device; and causing the user device to playback a third media content item responsive to the second single gesture input, the third media content item being automatically selected based on a force associated with the second single gesture input.

Clause 18. A computer-implemented method, comprising: receiving a request to initialize a media application, the request including data identifying a user account associated with a user device; generating a first playlist comprising a first plurality of media content items and a second playlist comprising a second plurality of media content items; providing a media content item of the first plurality of media content items for playback and a user interface comprising a representation of the media content item to the user device; receiving an indication of a single gesture input from the user device to transition from the media content item; and causing the user device to display another representation of another media content item of the second plurality of media content items in the user interface and to playback the another media content item in response to the indication of the single gesture input.

Clause 19. The computer-implemented method according to any preceding clause, wherein the single gesture input comprises a direction of gesture and a force of gesture, wherein the direction of gesture indicates a selection of different media content items from different playlists, and wherein the force of gesture indicates an amount of dissimilarity between the selected different media content items.

Clause 20. The computer-implemented method according to any preceding clause, wherein the single gesture input comprises a single swipe against a screen of the user device, the single swipe having a direction that represents one of at least two orthogonal directions to navigate through selections of different media content items of different playlists.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above may be embodied in, and fully or partially automated via, software code modules executed by one or more general purpose computers or processors. The code modules may be stored in any type of computer-readable storage medium or other computer storage device. Some or all of the methods may additionally or alternatively be embodied in specialized computer hardware.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method, comprising:
   receiving, by at least one processor, a request to initialize a media application, the request including data identifying a user account associated with a user device;
   generating, by the at least one processor, a first playlist for the user account, wherein the first playlist is generated based on media content playback history associated with the user account, wherein a data storage element stores a plurality of playlists including the first playlist, and wherein the data storage element includes a plurality of rows associated with the plurality of playlists, a plurality of columns associated with a plurality of media content items of the plurality of playlists, and a plurality of levels associated with different types or granularity of representations of the plurality of media content items;
   generating, by the at least one processor, a user interface comprising a first representation of a first media content item on the first playlist;
   providing, by the at least one processor, the user interface and the first media content item to the user device;
   causing, by the at least one processor, the user device to play back the first media content item;
   receiving, by the at least one processor, an indication of a first single gesture input from the user device, wherein the first single gesture input comprises a first direction of gesture;
   traversing the data storage element from an origin across a number of the playlists, across a number of the media content items, or across a number of the different types or granularity of representations of media content items based on the first direction of gesture of the first single gesture input;
   providing, by the at least one processor, a second media content item to the user device based on the traversing of the data storage element; and
   causing, by the at least one processor, the user device to display a first representation of the second media content item in the user interface, and to play back the second media content item in response to the indication of the first single gesture input.

2. The computer-implemented method of claim 1, wherein the first direction of gesture corresponds to traversing the plurality of columns of the data storage element and indicates a selection of playback of a different media content item from the first playlist, the method further comprising:
   receiving, by the at least one processor, an indication of a second single gesture input from the user device, wherein the second single gesture input comprises a second direction of gesture, wherein the second direction of gesture corresponds to traversing the plurality of rows of the data storage element and indicates a selection of playback of a different media content item from a second playlist of the data storage element.

3. The computer-implemented method of claim 1, the method further comprising:
receiving, by the at least one processor, an indication of a third single gesture input from the user device, wherein the third single gesture input comprises a third direction of gesture, and wherein the third direction of gesture corresponds to traversing the plurality of levels of the data storage element and indicates a selection of a different representation of the first media content item for display in the user interface.

4. The computer-implemented method of claim 1, wherein the first single gesture input comprises the first direction of gesture and at least one of a force or a duration of gesture, and wherein the second media content item is selected based on the first direction of gesture and the at least one of the force or the duration of gesture.

5. The computer-implemented method of claim 1, wherein the different types or granularity of representations include dynamic information based on the media content playback history associated with the user account.

6. The computer-implemented method of claim 1, wherein the different types or granularity of representations comprises one or more of: lyrics, associated album reviews, artist biographies, first media content item production credits, first media content item producer data, first media content item label data, or first media content item charting history.

7. A computer-implemented method, comprising:
receiving, by at least one processor, a request to open a media application on a user device;
generating, in a data storage element by the at least one processor, a first playlist comprising a first media content item, wherein the data storage element stores a plurality of playlists including the first playlist and a plurality of media content items of the plurality of playlists, and wherein the data storage element includes a plurality of rows associated with the plurality of playlists, a plurality of columns associated with the plurality of media content items, and a plurality of levels associated with different types or granularity of representations of the plurality of media content items;
providing, by the at least one processor, the first media content item and a user interface comprising a first representation of the first media content item to the user device;
causing, by the at least one processor, the user device to play back the first media content item;
receiving, by the at least one processor, an indication of a first single gesture input from the user device, the first single gesture input including a first direction of gesture;
traversing the data storage element from an origin across a number of the playlists, across a number of the media content items, or across a number of the different types or granularity of representations of media content items based on the first direction of gesture of the first single gesture input;
selecting, by the at least one processor, a second media content item and a first representation of the second media content item based on the traversing of the data storage element; and
causing, by the at least one processor, the user device to display the first representation of the second media content item in the user interface, and to play back the second media content item in response to the indication of the first single gesture input.

8. The computer-implemented method of claim 7, wherein the first single gesture input comprises the first direction of gesture and a force or a duration of gesture.

9. The computer-implemented method of claim 7, wherein the data storage element has an origin, and wherein the plurality of playlists and media content items are stored in the data storage element at respective distances from the origin that indicate a respective degree of similarity of content in the playlists and media content items to content in one or more media content items stored at the origin.

10. The computer-implemented method of claim 8, wherein the force or the duration of gesture indicates a degree of change between the first media content item and the second media content item, the degree of change including the number of the playlists of the data storage element to skip over, the number of the media content items to skip over, or the number of the different types or granularity of representations of media content items to skip over.

11. The computer-implemented method of claim 7, wherein the first direction of gesture represents one of three mutually orthogonal directions to navigate the data storage element along the plurality of rows, the plurality of columns, and the plurality of levels.

12. The computer-implemented method of claim 11, wherein an x-axis of the data storage element organizes a plurality of media content items associated with each playlist into the plurality of columns, wherein a y-axis of the data storage element organizes the plurality of playlists into the plurality of rows, wherein a z-axis of the data storage element organizes the different types or granularity of representations of the media content items into the levels for each media content item of a particular row and column, and wherein the first direction of gesture coincides with the x-axis of the data storage element, the y-axis of the data storage element, or the z-axis of the data storage element.

13. The computer-implemented method of claim 12, wherein the first single gesture input further comprises a force or a duration of gesture, and wherein the force or the duration of gesture indicates a number of the rows, the columns, or the levels to skip over to select the second media content item for playback, wherein media content items in the rows, columns, or levels that are skipped over are omitted from playback on the user device.

14. The computer-implemented method of claim 12, wherein the different types or granularity of representations of the media content items includes at least one of: lyrics for the media content items, user reviews for the media content items, biographies associated with a creator of the media content items, awards won by the media content items, producers of the media content items, or charting history of the media content items.

15. The computer-implemented method of claim 7, wherein a direction of navigation of the data storage element away from the origin of the data storage element denotes one or more of: a respective change of time of day associated with the plurality of media content items in the data storage element relative to a current time, a respective degree of similarity of one or more audio characteristics of the plurality of media content items to an origin media content item at the origin, a respective date that the plurality of media content items were created relative to the origin media content item, or a respective recency of the plurality of media content items being selected by a user of the user device.

16. The computer-implemented method of claim 7, further comprising:
receiving, by the at least one processor, an indication of a second single gesture input; and
causing, by the at least one processor, the user device to transition from audio playback to video playback of the second media content item responsive to the second single gesture input.

17. The computer-implemented method of claim 7, further comprising:
receiving, by the at least one processor, an indication of a second single gesture input from the user device; and
causing, by the at least one processor, the user device to play back a third media content item responsive to the second single gesture input, the third media content item being automatically selected based on a force or a duration associated with the second single gesture input.

18. A computer-implemented method, comprising:
receiving, by at least one processor, a request to initialize a media application for a user device;
obtaining, by the at least one processor, a first playlist comprising a first plurality of media content items, wherein a data storage element stores a plurality of playlists including the first playlist, and wherein the data storage element includes a plurality of rows associated with the plurality of playlists, a plurality of columns associated with a plurality of media content items of an associated playlist, and a plurality of levels associated with different types or granularity of representations of the plurality of media content items;
causing, by the at least one processor, a first representation of a first media content item of the first plurality of media content items to be displayed in a user interface of the user device;
causing, by the at least one processor, playback of the first media content item by the user device;
receiving, by the at least one processor, an indication of a first single gesture input, wherein the indication includes a direction of gesture;
traversing the data storage element from an origin across a number of the playlists, across a number of the media content items, or across a number of the different types or granularity of representations of media content items based on the direction of gesture of the first single gesture input;
obtaining, by the at least one processor, a second media content item and a first representation of the second media content item based on the traversing of the data storage element; and
causing, by the at least one processor, display of the first representation of the second media content item in the user interface, and playback of the second media content item to be initiated in response to the indication of the first single gesture input.

19. The computer-implemented method of claim 18, wherein the first single gesture input comprises a first direction of gesture and a force or a duration of gesture, wherein the first direction of gesture indicates a selection of different media content items from different playlists, and wherein the force or the duration of gesture indicates an amount of dissimilarity between the selected different media content items.

20. The computer-implemented method of claim 18, wherein traversing the data storage element includes:
in response to the direction of gesture being along a first axis:
traversing a row associated with the first playlist and obtaining, by the at least one processor, the second media content item from the first playlist based on the indication of the first single gesture input; and
causing, by the at least one processor, the first representation of the second media content item to be displayed in the user interface, and playback of the second media content item to be initiated in response to the indication of the first single gesture input;
in response to the direction of gesture being along a second axis different from the first axis:
traversing a column of the data storage element and obtaining, by the at least one processor, the second media content item from a second playlist of the data storage element; and
causing, by the at least one processor, the first representation of the second media content item to be displayed in the user interface, and playback of the second media content item to be initiated in response to the indication of the first single gesture input; and
in response to the direction of gesture being along a third axis different from the first axis and the second axis:
selecting, by the at least one processor, a second representation of the first media content item from the data storage element that is different from the first representation of the first media content item; and
causing, by the at least one processor, the user device to display the second representation of the first media content item in the user interface.

\* \* \* \* \*